United States Patent
Jeon

(10) Patent No.: US 12,425,270 B2
(45) Date of Patent: Sep. 23, 2025

(54) APPARATUS AND METHOD FOR CHANNEL SOUNDING

(71) Applicant: Samsung Electronics Co., Ltd., Suwon-si (KR)

(72) Inventor: Eunsung Jeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 298 days.

(21) Appl. No.: 18/174,010

(22) Filed: Feb. 24, 2023

(65) Prior Publication Data

US 2023/0269116 A1 Aug. 24, 2023

(30) Foreign Application Priority Data

Feb. 24, 2022 (KR) ............ 10-2022-0024577
Jul. 12, 2022 (KR) ............ 10-2022-0085875

(51) Int. Cl.
| | |
|---|---|
| H04L 12/26 | (2006.01) |
| H04B 7/06 | (2006.01) |
| H04L 25/02 | (2006.01) |
| H04W 80/02 | (2009.01) |
| H04W 84/12 | (2009.01) |

(52) U.S. Cl.
CPC ......... *H04L 25/022* (2013.01); *H04B 7/0617* (2013.01); *H04B 7/0639* (2013.01); *H04L 25/0204* (2013.01); H04W 80/02 (2013.01); H04W 84/12 (2013.01)

(58) Field of Classification Search
CPC ... H04L 25/022; H04L 25/0204; H04L 47/10; H04L 43/50; H04L 12/2697; H04L 43/0852; H04L 43/00; H04B 7/0617; H04B 7/0639; H04B 7/0634; H04B 7/063; H04W 80/02; H04W 84/12
See application file for complete search history.

(56) References Cited

U.S. PATENT DOCUMENTS

| | | |
|---|---|---|
| 8,532,216 B2 | 9/2013 | Huang et al. |
| 9,313,691 B2 | 4/2016 | Zhang |
| 10,148,330 B2 | 12/2018 | Jiang et al. |
| 10,200,165 B2 | 2/2019 | Seok |
| 10,903,882 B2 | 1/2021 | Jeon et al. |

(Continued)

OTHER PUBLICATIONS

"Part 11: Wireless LAN Medium Access Control (MAC) and Physical Layer (PHY) Specifications", IEEE Std 802.11ax 2021.

(Continued)

*Primary Examiner* — Phuongchau Ba Nguyen
(74) *Attorney, Agent, or Firm* — Fish & Richardson P.C.

(57) ABSTRACT

An operation method of a first apparatus configured to communicate with a second apparatus in a wireless local area network (WLAN) system including the first apparatus and the second apparatus includes receiving, from the second apparatus, a null data packet (NDP) based on a certain protocol standard, estimating a channel with the second apparatus on the basis of the NDP, determining, on the basis of the estimated channel, whether or not a channel smoothing-related condition is satisfied, generating channel smoothing-related phase information on the basis of a result of the determination, and transmitting, to the second apparatus, a feedback frame including the channel smoothing-related phase information.

18 Claims, 21 Drawing Sheets

(56) References Cited

U.S. PATENT DOCUMENTS

| | | | |
|---|---|---|---|
| 11,799,529 B2* | 10/2023 | Jeon | H04B 7/0617 |
| 2010/0104053 A1* | 4/2010 | Wang | H04L 25/0204 |
| | | | 375/346 |
| 2012/0082193 A1* | 4/2012 | Van Zelst | H04B 7/0413 |
| | | | 375/219 |
| 2017/0331534 A1* | 11/2017 | Jiang | H04B 7/0617 |
| 2020/0091970 A1* | 3/2020 | Lee | H04B 7/0634 |
| 2021/0281303 A1 | 9/2021 | Jeon et al. | |
| 2022/0345904 A1* | 10/2022 | Jeon | H04B 7/0617 |
| 2023/0096177 A1* | 3/2023 | Yu | H04L 27/2613 |
| 2023/0397179 A1* | 12/2023 | Park | H04L 5/00 |
| 2024/0275566 A1* | 8/2024 | Lin | H04L 5/0053 |

OTHER PUBLICATIONS

Jeon et al. "Joint Beamformer and Beamformee Design for Channel Smoothing in WLAN Systems", 2020, IEEE 92nd Vehicular Technology Conference.
Sadowsky et al., "WiSE Preambles and MIMO Beamforming", IEE 802.11-05/1635r1, Jan. 15, 2005.

* cited by examiner

FIG. 11

| Order | Information |
|---|---|
| 1 | Category |
| 2 | EHT Action |
| 3 | EHT MIMO Control |
| 4 | EHT Compressed Beamforming Report |
| 5 | EHT MU Exclusive Beamforming Report |
| 6 | EHT CQI Report |
| 7 | EHT Smooth Beamforming Report |

FIG. 13

| Subfield | Size (bits) | Meaning |
|---|---|---|
| Start Subcarrier Index | 16 | The first subcarrier index for which the Smooth Beamforming Information subfield starts |
| Smooth Beamforming Information subfield for subcarrier k=scidx(n) | $(N_C \times b_\phi)/2$ | The order of angles in the Smooth Beamforming information subfield defined |
| Smooth Beamforming Information subfield for subcarrier k=scidx(n+1) | $(N_C \times b_\phi)/2$ | The order of angles in the Smooth Beamforming Information subfield defined |
| ... | | |
| Smooth Beamforming Information subfield for subcarrier k=scidx($N_s$ −1) | $(N_C \times b_\phi)/2$ | The order of angles in the Smooth Beamforming Information subfield defined |

FIG. 14

| Size of V | Number of angles | The order of angles Smooth Beamforming Information subfield for subcarrier k, where k=scid(0), scid(1), ..., scid($N_s$-1) |
|---|---|---|
| $N_{rx} \times N_c$ | $N_c$ | $\Phi_{N_{rx}1}(k) \, \Phi_{N_{rx}2}(k), ..., \Phi_{N_{rx}N_c}(k)$ |

FIG. 15

| Subfield | Definition | Encoding |
|---|---|---|
| Smooth Beamforming Feedback | For an AP, indicates support for the reception of smooth beamforming information feedback. For a non-AP STA, indicates support for the transmission of smooth beamforming information feedback. | Set to 0 if not supported. Set to 1 if supported. |

— # APPARATUS AND METHOD FOR CHANNEL SOUNDING

CROSS-REFERENCE TO RELATED APPLICATIONS

This application is based on and claims priority under 35 U.S.C. § 119 to Korean Patent Application Nos. 10-2022-0024577 and 10-2022-0085875, filed on Feb. 24, 2022 and Jul. 12, 2022, respectively, in the Korean Intellectual Property Office, the disclosures of which are incorporated by reference herein in their entireties.

BACKGROUND

The inventive concepts relate to wireless communications, and more particularly, to apparatuses and methods for channel sounding based on a certain protocol standard.

As an example of wireless communication, a wireless local area network (WLAN) is technology for connecting two or more apparatuses to each other by using a wireless signal transmission method, and the WLAN technology may be based on the institute of electrical and electronics engineers (IEEE) 802.11 standard. The 802.11 standard has evolved into 802.11b, 802.11a, 802.11g, 802.11n, 802.11ac, 802.11ax, and the like, and may support transmission rates up to 1 Gbyte/s on the basis of orthogonal frequency-division multiplexing (OFDM) technology.

In 802.11ac, data may be transmitted simultaneously or contemporaneously to a plurality of users via a multi-user multi-input multi-output (MU-MIMO) technique. In addition, 802.11be, which is referred to as extremely high throughput (EHT), and a next generation protocol standard after EHT (hereinafter, referred to as EHT+) have tried to implement support of a 6 GHz unlicensed frequency band, utilization of a bandwidth of a maximum of 320 MHz per channel, introduction of hybrid automatic repeat and request (HARD), support of a maximum of 16×16 MIMO, and the like.

In addition, in an MU-MIMO communication environment, a beamforming process may be used to improve communication performance. In detail, a beamformer (or an access point), which performs a beamforming process, may perform beamforming on the basis of feedback regarding a channel received from a beamformee (or a station). The beamformer may provide a beamformed signal to the beamformee. Moreover, when the beamformee performs a channel smoothing operation on the received signal, there is discontinuity between beamforming matrices corresponding to adjacent subcarriers from among subcarriers of the signal. Therefore, loss of discontinuous components may occur, and thus, energy of the signal may be reduced, thereby increasing a packet error rate (PER). Accordingly, the beamformee does not perform a separate channel smoothing operation on the beamformed signal.

SUMMARY

The inventive concepts provide apparatuses and methods for channel sounding, which reduce discontinuity between beamforming matrices corresponding to adjacent subcarriers so that a beamformee may perform a channel smoothing operation on a beamformed signal in a wireless communication system.

According to aspects of the inventive concepts, there is provided an operation method of a first apparatus configured to communicate with a second apparatus in a wireless local area network (WLAN) system including the first apparatus and the second apparatus including receiving, from the second apparatus, a null data packet (NDP) based on a certain protocol standard, estimating a channel with the second apparatus on the basis of the NDP, determining, on the basis of the estimated channel, whether or not a channel smoothing-related condition is satisfied, generating channel smoothing-related phase information on the basis of a result of the determination, and transmitting, to the second apparatus, a feedback frame including the channel smoothing-related phase information.

According to aspects of the inventive concepts, there is provided an operation method of a second apparatus configured to communicate with a first apparatus in a wireless local area network (WLAN) system including the first apparatus and the second apparatus including transmitting, to the first apparatus, a null data packet (NDP) based on a certain protocol standard, receiving, from the first apparatus in response to the transmitted NDP, a feedback frame including first information regarding a channel estimated between the first apparatus and the second apparatus, and second information indicating whether or not channel smoothing-related phase information is included, generating a smooth beamformed PPDU on the basis of the first information and the second information, and transmitting the smooth beamformed PPDU to the first apparatus.

According to aspects of the inventive concepts, there is provided a first apparatus configured to communicate with a second apparatus in a wireless local area network (WLAN) system including a transceiver configured to receive a null data packet (NDP) based on an extremely high throughput (EHT) protocol standard, and processing circuitry configured to determine, on the basis of a channel estimated between the first apparatus and the second apparatus in response to the NDP, whether or not a channel smoothing-related condition is satisfied, generate channel smoothing-related phase information on the basis of a result of the determination, and control the transceiver to transmit, to the second apparatus, a feedback frame including the channel smoothing-related phase information.

BRIEF DESCRIPTION OF THE DRAWINGS

Example embodiments will be more clearly understood from the following detailed description taken in conjunction with the accompanying drawings in which:

FIG. 11 is a table diagram illustrating information included in a feedback frame according to some example embodiments;

FIG. 13 is a table diagram illustrating a structure of an EHT Smooth Beamforming Report field of FIG. 11;

FIG. 14 is a table diagram illustrating a structure of an EHT Smooth Beamforming Report field of FIG. 11;

FIG. 15 is a table diagram illustrating a subfield of an EHT PHY Capabilities Information field indicating whether or not smooth beamforming feedback may be supported, according to some example embodiments;

DETAILED DESCRIPTION

Figure 1:
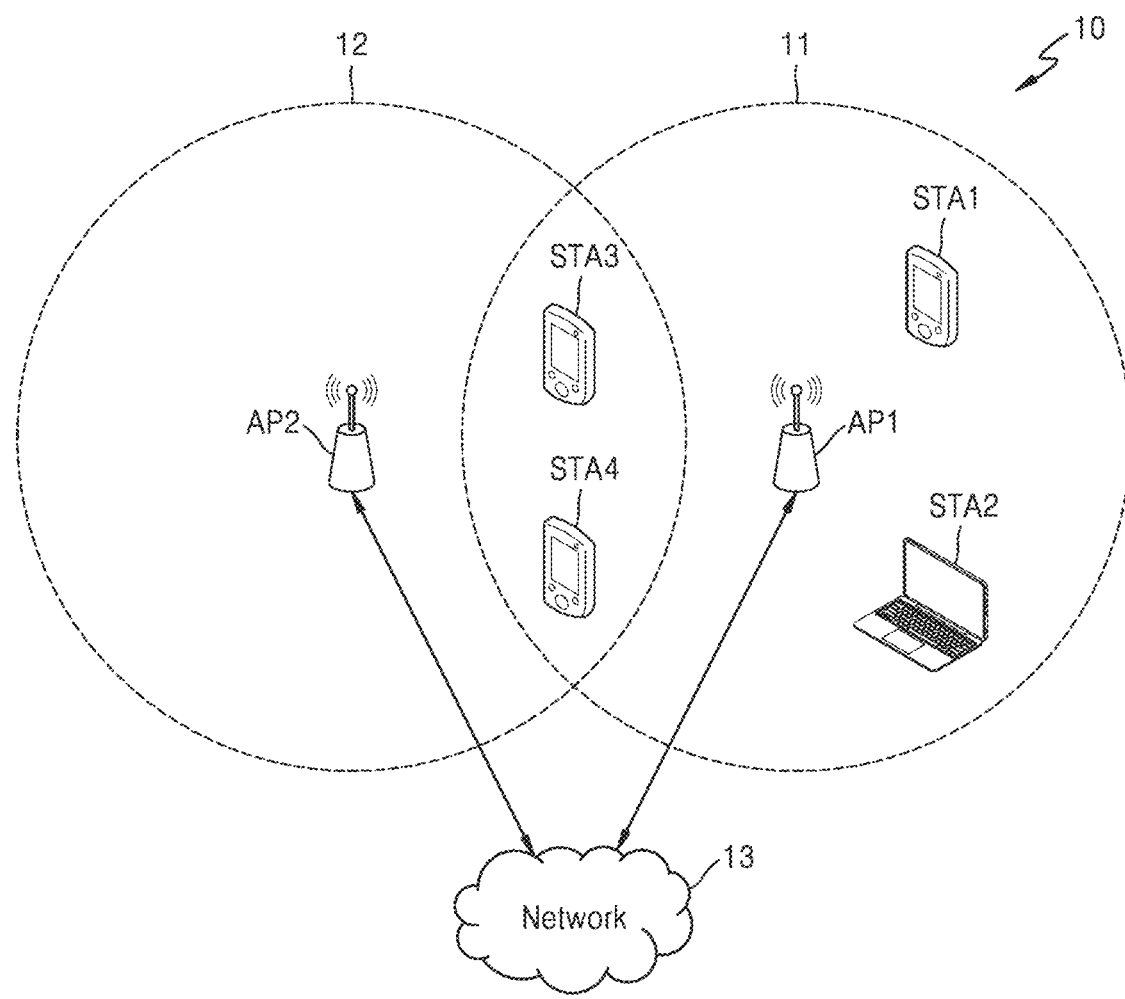
FIG. 1 is a view illustrating a wireless communication system according to some example embodiments.

FIG. 1 is a view illustrating a wireless communication system 10 according to some example embodiments. In detail, FIG. 1 illustrates a wireless local area network (WLAN) system as an example of the wireless communication system 10.

Advantages and features of the inventive concepts and methods for achieving thereof will become apparent with reference to example embodiments described below in detail together with the accompanying drawings. However, the inventive concepts are not limited to the example embodiments illustrated below, but the example embodiments will be implemented in various different forms, may be used interchangeably, and are provided so that the description of the inventive concept will be thorough and complete. In addition, the example embodiments are provided to fully convey the scope of the inventive concepts to one of ordinary skill in the art, and the scope of the inventive concepts are defined only by the scope of claims. Also, particular elements described only in each example embodiment may also be used in the other example embodiments. As used herein, the same reference numerals denote the same elements.

The terminology used herein is for the purpose of describing particular embodiments only and is not intended to limit the scope of the example embodiments. As used herein, the singular forms are intended to include the plural forms as well, unless the context clearly indicates otherwise. It will be further understood that the terms "comprises" and/or "comprising" when used herein, specify the presence of stated elements, steps, operations, and/or devices, but do not preclude the presence or addition of one or more other elements, steps, operations, and/or devices thereof.

Unless otherwise defined, all terms (including technical and scientific terms) used herein have the same meaning as commonly understood by one of ordinary skill in the art to which the example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In addition, when describing example embodiments in detail, an orthogonal frequency division multiplexing (OFDM) or an orthogonal frequency division multiple access (OFDMA)-based wireless communication system, in particular, IEEE 802.11 standards, will be mainly considered. However, the subject matter of the inventive concepts may also be applied, with some modifications by one of ordinary skill in the art, to other communication systems (e.g., cellular communication systems, such as long term evolution (LTE), LTE-advanced (LTE-A), new radio (NR), wireless broadband (WiBro), or global system for mobile communication (GSM), or short-range communication systems, such as near field communication (NFC)) having similar technical backgrounds and channel forms without departing from the scope of the inventive concepts.

Also, before the description below, the definitions of certain words and phrases used herein may be described. The term "connect (combine)" and derivatives thereof refer to any direct or indirect communication between two or more elements, regardless of whether or not the elements are in physical contact with each other. The terms "transmit", "receive", and "communicate", and derivatives thereof include both direct and indirect communication. The terms "comprise" and "include", and derivatives thereof mean unrestricted inclusion. A used herein, the terms "and/or" includes any and all combinations of one or more of the associated listed items. "Is related to ~", and derivatives thereof include "include", "is include in ~", "interconnect with ~", "contain", "is contained in ~", "is connected with or to ~", "is combined to/with", "may communicate with ~", "cooperate with ~", "intervene", "place side by side", "approximate to ~", "is restricted to ~", "have", "have the characteristics of ~", "have a relationship with ~", and the like. The term "controller" refers to any apparatus, system, or portion thereof that controls at least one operation. Such a controller may be implemented in hardware, or a combination of hardware, software, and/or firmware. Functions related to any particular controller may be centralized or distributed locally or remotely. The term "at least one ~" means that, when used with a list of items, one or more different combinations of the listed items may be used, and only one item in the list may be used. For example, "at least one of A, B, and C" includes any one of combinations of A, B, C, A, and B, A and C, B and C, and A, B, and C.

In addition, various functions described below may be implemented or supported by artificial intelligence technology, or one or more computer programs, and each of the programs includes computer-readable program code and is executed on a computer-readable medium. The terms "application" and "program" refer to one or more computer programs, software components, instruction sets, procedures, functions, objects, classes, instances, associated data, or any portion thereof appropriate for implementation of appropriate computer-readable program code. The term "computer-readable program code" includes all types of computer code including source code, object code, and execution code. The term "computer-readable media" includes any type of media that may be accessed by a computer, such as read-only memory (ROM), random access memory (RAM), a hard disk drive, a compact disk (CD), a digital video disk (DVD), or any other type of memory. "Non-transitory" computer-readable media exclude wired, wireless, optical, or other communication links via which transient electrical or other signals are transmitted. Non-transitory computer-readable media include media in which data may be permanently stored, and media in which data may be stored and overwritten later, such as rewritable optical disks or erasable memory devices.

Various example embodiments below will describe a hardware approach method as an example. However, various example embodiments include technology using both hardware and software, and thus do not exclude a software-based approach method.

In addition, the terms referring to control information used in the description below, the terms referring to entry, the terms referring to network entity, the terms referring to messages, the terms referring to elements of an apparatus, and the like are illustrated for convenience of description. Accordingly, the inventive concepts are not limited to the terms described below, and other terms having equivalent technical meanings may be used.

Referring to FIG. 1, the wireless communication system 10 may include a first access point AP1, a second access point AP2, a first station STA1, a second station STA2, a third station STA3, and/or a fourth station STA4. The first access point AP1 and the second access point AP2 may access a network 13 including the Internet, an Internet protocol (IP) network, or any other network. The first access point AP1 may provide, within a first coverage area 11, access to the network 13 to the first station STA1, the second station STA2, the third station STA3, and the fourth station STA4, and the second access point AP2 may also provide, within a second coverage area 12, access to the network 13 to the third station STA3 and the fourth station STA4. In some example embodiments, the first access point AP1 and the second access point AP2 may communicate with at least one of the first station STA1, the second station STA2, the third station STA3, and the fourth station STA4 on the basis of wireless fidelity (WiFi) or any other WLAN access technology.

An access point may be referred to as a router, a gateway, or the like, and a station may be referred to as a mobile station, a subscriber station, a terminal, a mobile terminal, a wireless terminal, user equipment, or the like. The station may also be a portable device, such as a mobile phone, a laptop computer, or a wearable device, or a stationary apparatus, such as a desktop computer or a smart TV. As used herein, the station may be referred to as a first apparatus, and the access point may be referred to as a second apparatus.

The first access point AP1 and the second access point AP2 may allocate at least one resource unit (RU) to at least one of the first station STA1, the second station STA2, the third station STA3, and the fourth station STA4. The first access point AP1 and the second access point AP2 may transmit data via the allocated at least one resource unit, and the at least one station may receive data via the allocated at least one resource unit. While in 802.11ax, the first access point AP1 and the second access point AP2 may allocate only a single resource unit to at least one station, in 802.11be (hereinafter, extremely high throughput (EHT)) or next-generation IEEE 802.11 standards (hereinafter, EHT+), the first access point AP1 and the second access point AP2 may allocate, to at least one station, a multi-resource unit (MRU) including two or more resource units. For example, the first access point AP1 may allocate a multi-resource unit to at least one of the first station STA1, the second station STA2, the third station STA3, and the fourth station STA4, and may transmit data via the allocated multi-resource unit.

In some example embodiments, the first access point AP1 and the second access point AP2 may communicate with at least one of the first station STA1, the second station STA2, the third station STA3, and the fourth station STA4 by using a beamforming technique. For example, single user beamforming may improve reception performance of a single user, and multi-user beamforming may improve reception performance of all multiple users by eliminating interference between the multiple users. The first access point AP1 and the second access point AP2, and the first to fourth stations STA1 to STA4 may perform, for beamforming, channel sounding, and the channel sounding may be based on a sounding protocol. As will be described later with reference to the drawings, the first access point AP1 and the second access point AP2 may efficiently perform channel sounding together with the first to fourth stations STA1 to STA4 supporting various protocol standards (e.g., EHT, EHT+, and the like). Hereinafter, a schematic example embodiment of channel sounding between the first access point AP1 and the first station STA1 will be described. The technical spirit of channel sounding between the first access point AP1 and the first station STA1 may also be applied to the second access point AP2 and the second to fourth stations STA2 to STA4.

The first access point AP1 may transmit, to the first station STA1, a null data packet (NDP) based on a certain protocol standard. The first station STA1 may estimate a channel with the first access point AP1 in response to the NDP, and may generate, from the estimated channel, information regarding the estimated channel and phase information. As used herein, the phase information may be referred to as channel smoothing-related phase information. Hereinafter, the channel smoothing-related phase information generated by the first station STA1 may be provided to the first access point AP1 to minimize loss occurring when the first station STA1 performs channel smoothing on a signal beamformed by the first access point AP1. As used herein, the signal beamformed by the first access point AP1 may be a smooth beamformed signal. A method of generating the channel smoothing-related phase information by the first station STA1 may be based on the number of antennas of the first station STA1, and the detailed description thereof will be given below. The information regarding the estimated channel may include angle information of a beam steering matrix for each subcarrier, which is generated from a result of singular value decomposition for the channel estimated by the first station STA1. The first station STA1 may transmit, to the first access point AP1, a feedback frame including the information regarding the estimated channel and the channel smoothing-related phase information. The first access point AP1 may perform beamforming on the first station STA1 by reflecting the phase information in the information regarding the estimated channel. In other words, the first access point AP1 may generate beamforming matrices in which discontinuity between adjacent subcarriers is reduced, by reflecting the channel smoothing-related phase information in the information regarding the estimated channel. As described herein, a relationship between adjacent subcarriers may be interpreted as a relationship between matrices corresponding to the adjacent sub carriers. The detailed description of beamforming by the first access point AP1 will be given below. The first access point AP1 may transmit a beamformed signal (or physical layer protocol data unit (PPDU)) to the first station STA1. The first station STA1 may perform channel smoothing on the beamformed signal.

In some example embodiments, the first station STA1 may generate the channel smoothing-related phase information on the basis of whether or not a particular condition is satisfied, to minimize unneeded (e.g., extraneous) calculation operations and efficiently use time-frequency resources.

When performing channel smoothing on the signal beamformed by the first access point AP1, the first station STA1 may omit a calculation operation for the channel smoothing-related phase information, and transmit the channel smoothing-related phase information to the first access point AP1 by filling meaningless data into the channel smoothing-related phase information, when loss generated is not expected to be large, e.g., when the particular condition is not satisfied. In addition, when performing channel smoothing on the signal beamformed by the first access point AP1, the first station STA1 may generate the channel smoothing-related phase information including pieces of phase information, which may be used by the first access point AP1 during beamforming, by performing a calculation operation for the channel smoothing-related phase information, and may transmit the channel smoothing-related phase information to the first access point AP1, when loss generated is expected to be large, e.g., when the particular condition is satisfied.

In some example embodiments, the first station STA1 may determine, on the basis of the estimated channel, whether or not the channel smoothing-related condition is satisfied, by using the NDP received from the first access point AP1. The first station STA1 may generate the channel smoothing-related phase information on the basis of a result of the determination.

Meanwhile, some example embodiments and the like of transmitting and receiving phase information between the first access point AP1 and the first station STA1 and performing beamforming by using the phase information may be defined in a certain protocol standard. For example, the certain protocol standard may be an EHT protocol standard or an EHT+ protocol standard.

The first access point AP1 and the second access point AP2 according to some example embodiments may receive, from the first to fourth stations STA1 to STA4, phase information for minimizing loss occurring due to channel smoothing of the first to fourth stations STA1 to STA4 on a beamformed signal, and may use the phase information for beamforming. Accordingly, a positive effect of a channel smoothing operation of the first to fourth stations STA1 to STA4 on a signal beamformed by the first access point AP1 and the second access point AP2 may be significantly increased.

The first to fourth stations STA1 to STA4 according to some example embodiments may efficiently use hardware resources of the first to fourth stations STA1 to STA4 and time-frequency resources for communication by determining, on the basis of estimated channels with the first access point AP1 and the second access point AP2, whether or not a channel smoothing-related condition is satisfied and generating channel smoothing-related phase information on the basis of a result of the determination.

Figure 2:
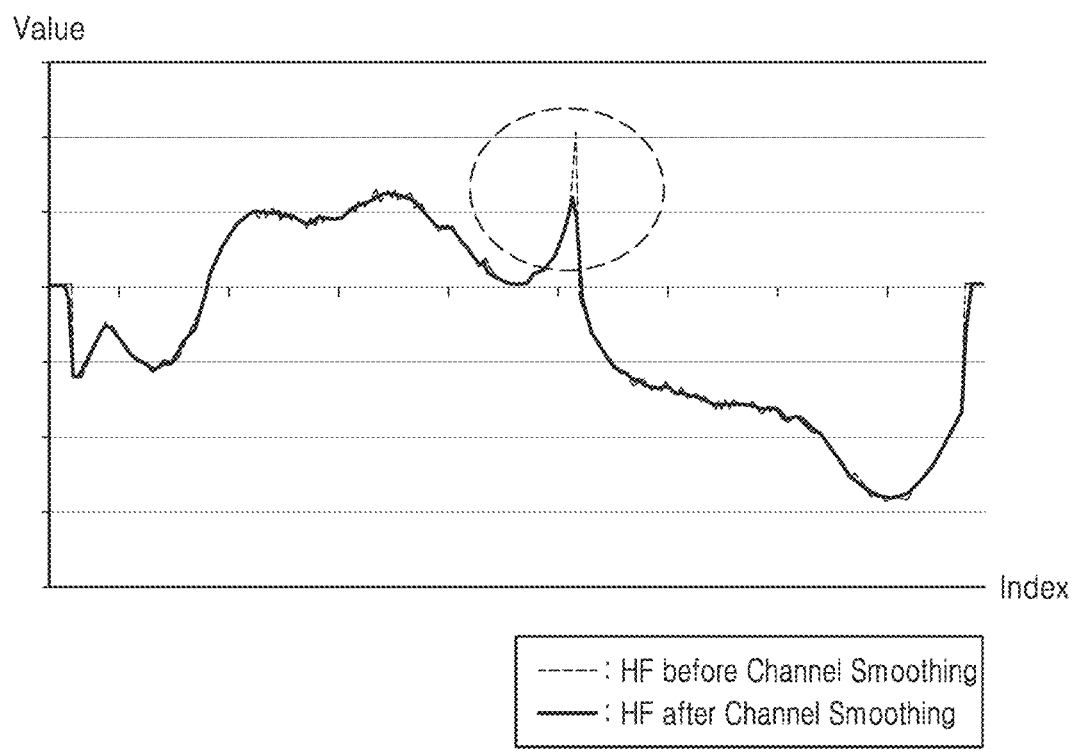
FIG. 2 is a graph illustrating, in a comparative example, discontinuity of a beamforming matrix for each subcarrier corresponding to a signal beamformed by an access point.

FIG. 2 is a graph illustrating, in a comparative example, discontinuity of a beamforming matrix for each subcarrier corresponding to a signal beamformed by an access point.

Referring to FIG. 2, in the comparative example, an access point may perform beamforming on a station on the basis of a feedback frame received from the station. Here, the beamforming performed by the access point may be smooth beamforming. Meanwhile, as indicated by a broken line, discontinuity may occur between beamforming matrices HF corresponding to certain adjacent subcarriers due to smooth beamforming. When the station performs channel smoothing on the beamforming matrices HF having discontinuity, large energy loss may occur as shown in FIG. 2. The access point may receive, from the station, a feedback frame including channel smoothing-related phase information, and may perform beamforming on the station by using the channel smoothing-related phase information, to prevent or reduce the large energy loss.

Figure 3:
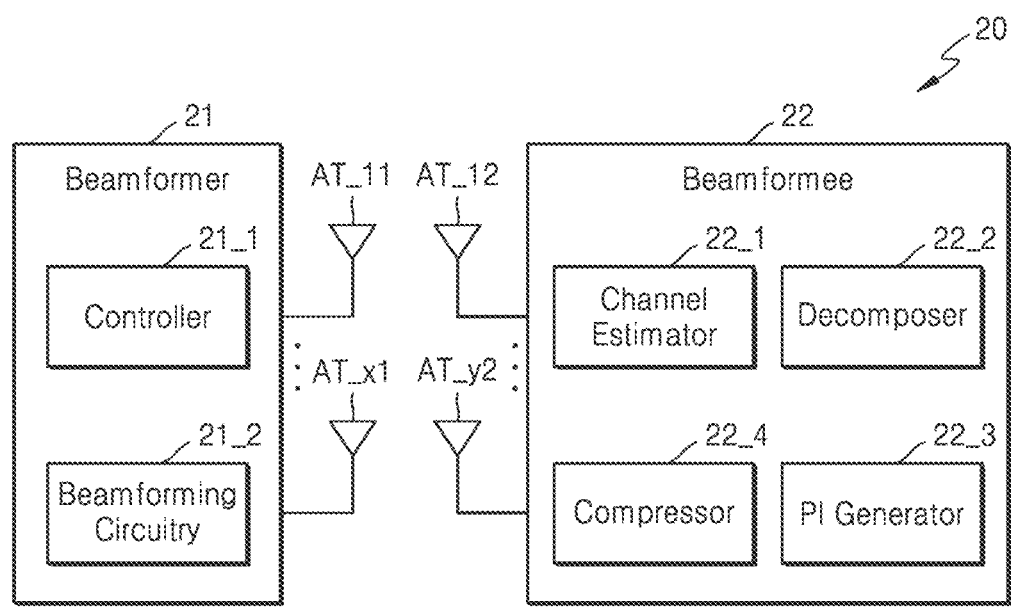
FIG. 3 is a block diagram illustrating a wireless communication system according to some example embodiments.

FIG. 3 is a block diagram illustrating a wireless communication system 20 according to some example embodiments. The block diagram of FIG. 3 illustrates a beamformer 21 and a beamformee 22 communicating with each other in the wireless communication system 20. Each of the beamformer 21 and the beamformee 22 may be any apparatus communicating in the wireless communication system 20, and may be referred to as an apparatus for wireless communication. In some example embodiments, each of the beamformer 21 and the beamformee 22 may be an access point or a station of a WLAN system.

Referring to FIG. 3, the beamformer 21 may include a controller 21_1, a beamforming circuitry 21_2, and a plurality of first antennas A_11 to AT_x1. The controller 21_1 and the beamforming circuitry 21_2 may be defined as a processing circuitry of the beamformer 21. The beamformee 22 may include a channel estimator 22_1, a decomposer 22_2, a phase information generator 22_3, a compressor 22_4, and a plurality of second antennas AT_12 to AT_y2. The channel estimator 22_1, the decomposer 22_2, the phase information generator 22_3, and the compressor 22_4 may be defined as a processing circuitry of the beamformee 22. Hereinafter, the beamformee 22 will be first described.

The beamformee 22 may receive an NDP via the plurality of second antennas AT_12 to AT_y2. The channel estimator 22_1 may estimate a channel by using a reference signal included in the received NDP. In some example embodiments, the NDP may also be referred to as a sounding packet. The NDP $y_k$ received to estimate the channel by the channel estimator 22_1 may be expressed as in Equation 1.

$$y_k = H_k x_k + n_k \quad (1)$$

In Equation 1, $H_k$ is a channel matrix, $x_k$ is a transmission data stream, and $n_k$ may denote thermal noise. k may denote a subcarrier index of a channel, and may have a range of 1 to $N_{FFT}$. Accordingly, the channel matrix $H_k$ may have a size of Nr×Nt for each subcarrier. Here, Nr is the number of second antennas AT_12 to AT_y2, and Nt is the number of first antennas AT_11 to AT_x1. Each of the elements of Equation 1 may be defined as a matrix or a vector. The transmission data stream $x_k$ may have, for example, a size of Ns×1. Here, Ns is the number of transmission streams. The thermal noise $n_k$ may refer to white Gaussian noise. The thermal noise $n_k$ may have a size of Nr×1.

The channel estimator 22_1 may generate channel state information on the basis of the estimated channel. The channel state information may include at least one of a channel quality indicator (CQI), a precoding matrix indicator (PMI), and a rank indicator (RI).

The decomposer 22_2 may perform, as in Equation 2, singular value decomposition on the channel $\hat{H}_{est,k}$ estimated by the channel estimator 22_1.

$$\hat{H}_{est,k} = U_k \Sigma_k V_k^h \quad (2)$$

In Equation 2, $U_k$ is a left singular matrix, and $V_k$ is a right singular matrix and may include a Hermitian operator. $\Sigma_k$ may be a diagonal matrix including non-negative singular values.

The left singular matrix $U_k$ may have a size of Nr×Nss. The right singular matrix $V_k$ may have a size of Ntx×Nss. In addition, $\Sigma_k$ may have a size of Nss×Nss. The right singular matrix $V_k$ may be referred to as an initial beam steering matrix. In the wireless communication system 20 (e.g., an IEEE 802.11n/ac/ax WLAN system) according to some example embodiments, the beamformer 21 may transmit a signal to the beamformee 22 via orthogonal frequency division multiplexing (OFDM) modulation through which $N_{FFT}$ subcarriers in one symbol are guaranteed to have orthogonality with each other, and thus, a channel estimation operation of the channel estimator 22_1 and a singular value decomposition operation of the channel decomposer 22_2 may be performed for each subcarrier.

Meanwhile, the decomposer 22_2 may apply, to the initial beam steering matrix $V_k$ as in Equation 3, the diagonal matrix D for performing a common phase shift without intactly transmitting the initial beam steering matrix $V_k$ to the beamformer 21, to reduce feedback overhead transmitted to the beamformer 21.

$$Q_k = V_k D \quad (3)$$

$Q_k$ is a beam steering matrix, and a first diagonal matrix D may be a matrix for allowing an element of a last row of each column of the beam steering matrix $Q_k$ to have a real value. As an example, the first diagonal matrix D may be $$\left( e^{-j\phi(N_{tx},1)}, \ldots, e^{-j\phi(N_{tx},N_{tx})} \right),$$

and for example, $$e^{-j\phi(N_{tx},1)}$$

may refer to a phase value of an element corresponding to a $N_{tx}^{th}$ row and a first column of the initial beam steering matrix $V_k$. In some example embodiments, the first diagonal matrix D may include a phase value of an element of a last row of each column of the initial beam steering matrix $V_k$.

The compressor 22_4 may acquire, as in Equations 4 to 6, angle information $\phi$, $\Psi$ regarding the beam steering matrix $Q_k$ generated via the decomposer 22_2.

$$Q_k = \left[ \prod_{i=1}^{min(N_{ss},N_{tx}-1)} \left[ D_i\left(1_{i-1}, e^{j\phi_{i,i}}, \ldots, e^{j\phi_{N_{r-1,i}}}, 1\right) \prod_{l=i+1}^{N_{tx}} G_{li}^T(\psi_{li}) \right] \right] \tilde{I}_{N_{tx} \times N_{ss}} \quad [\text{Equation 4}]$$

In Equation 4, $1_{i-1}$ is a vector including 1 having a length of i−1. $I_{Ntx \times Nss}$ is an identity matrix having a size of Ntx×Nss.

In Equation 4, $D_i(1_{i-1}, e^{j\phi_{i,i}}, \ldots, e^{j\phi_{N_{r-1,i}}}, 1)$ may be expressed as a second diagonal matrix as in Equation 5 below.

$$D_i\left(1_{i-1}, e^{j\phi_{i,i}}, \ldots, e^{j\phi_{N_{tx-1,i}}}, 1\right) = \begin{bmatrix} I_{i-1} & 0 & \ldots & \ldots & 0 \\ 0 & e^{j\phi_{i,i}} & 0 & \ldots & 0 \\ \vdots & 0 & \ddots & 0 & 0 \\ \vdots & \vdots & 0 & e^{j\phi_{N_{tx-1,i}}} & 0 \\ 0 & 0 & 0 & 0 & 1 \end{bmatrix}, \quad [\text{Equation 5}]$$

In Equation 4, $G_{li}(\Psi)$ is a givens rotation matrix, and may be expressed as in Equation 6 below.

$$G_{li}(\psi) = \begin{bmatrix} I_{i-1} & 0 & 0 & \ldots & 0 \\ 0 & \cos(\psi) & 0 & \sin(\psi) & 0 \\ 0 & 0 & I_{l-i-1} & 0 & 0 \\ 0 & -\sin(\psi) & 0 & \cos(\psi) & 0 \\ 0 & 0 & 0 & 0 & I_{Ntx-1} \end{bmatrix} \quad [\text{Equation 6}]$$

The compressor 22_4 may quantize the acquired angle information $\phi$, $\Psi$.

In some example embodiments, the phase information generator 22_3 may generate channel smoothing-related phase information by different methods according to the number of second antennas AT_12 to AT_y2. For example, when one second antenna is included, the phase information generator 22_3 may generate, as the channel smoothing-related phase information, phases of elements of the first diagonal matrix D used to generate the beam steering matrix $Q_k$ from the initial beam steering matrix $V_k$. In the above method, the phase information generator 22_3 may generate, for each subcarrier, channel smoothing-related phase information including phases of the first diagonal matrices D. As another example, when two or more second antennas are included, the phase information generator 22_3 may generate, as channel smoothing-related phase information, phases for minimizing a euclidean distance between beam steering matrices corresponding to adjacent subcarriers or for maximizing a cross-correlation between the beam steering matrices. In the above method, the phase information generator 22_3 may generate, for each subcarrier, channel smoothing-related phase information including phases for maximizing a cross-correlation between beam steering matrices corresponding to adjacent subcarriers. For example, when subcarriers include first to third subcarriers, phase information corresponding to the first subcarrier includes phases for maximizing a cross-correlation between beam steering matrices of the second subcarrier adjacent to a beam steering matrix of the first subcarrier. Phase information corresponding to the second subcarrier includes phases for maximizing a cross-correlation between beam steering matrices of the third subcarrier adjacent to the beam steering matrix of the second subcarrier. The detailed description thereof will be given below.

In some example embodiments, the phase information generator 22_3 may determine whether or not a channel smoothing-related condition is satisfied, by using the beam steering matrices $Q_k$ corresponding to subcarriers, which are acquired from the estimated channel $\hat{H}_{est,k}$.

For example, the phase information generator 22_3 may sequentially determine whether or not subcarriers arranged on the basis of an index satisfy the channel smoothing-related condition. For example, the phase information generator 22_3 may determine, as a start subcarrier, a subcarrier that first satisfies the channel smoothing-related condition, and may omit determining whether or not subcarriers after the start subcarrier satisfy the channel smoothing-related condition.

In some example embodiments, whether or not each subcarrier satisfies the channel smoothing-related condition may be determined on the basis of a relationship between the beam steering matrices $Q_k$ corresponding to adjacent subcarriers. For example, the channel smoothing-related condition may include at least one of a first condition that an euclidean distance between the beam steering matrices $Q_k$ corresponding to adjacent subcarriers is greater than or equal to a first reference value, and a second condition that a cross-correlation between the beam steering matrices $Q_k$ corresponding to adjacent subcarriers is less than or equal to a second reference value. In some example embodiments, the phase information generator 22_3 may determine at least one of a plurality of criteria as the channel smoothing-related condition, on the basis of a communication state between the beamformer 21 and the beamformee 22. For example, when the communication state between the beamformer 21 and the beamformee 22 is poor, the phase information generator 22_3 may determine only one of the first condition and the second condition as the channel smoothing-related condition, and, when the communication state between the beamformer 21 and the beamformee 22 is of high quality, may determine the first condition and the second condition as the channel smoothing-related condition.

In some example embodiments, the phase information generator 22_3 may generate channel smoothing-related phase information including pieces of phase information corresponding to a start subcarrier from among subcarriers, and the other subcarriers after the start subcarrier. A detailed structure of a feedback frame related to channel smoothing-related phase information will be described later.

The compressor 22_4 according to some example embodiments may generate a feedback frame including the quantized angle information $\phi$, $\Psi$ and the channel smoothing-related phase information. Here, the quantized angle information $\phi$, $\Psi$ may be referred to as information regarding the channel estimated by the channel estimator 22_1. The beamformee 22 may transmit the feedback frame to the beamformer 21 via a transceiver (not shown) of the beamformee 22 and the plurality of second antennas AT_12 to AT_y2.

The beamformer 21 may receive the feedback frame from the beamformee 22 via a transceiver (not shown) and the plurality of first antennas AT_11 to AT_x1. The controller 21_1 may control the overall operation of the beamformer 21 for communication. The controller 21_1 may generate a null data packet announcement (NDPA) frame and an NDP, which will be described later, and may process information included in the feedback frame to be used by the beamforming circuitry 21_2. A format of the NDPA frame and a format of the feedback frame according to some example embodiments will be described later.

The beamforming circuitry 21_2 according to some example embodiments may perform smooth beamforming on the beamformee 22, on the basis of the feedback frame. Performing beamforming may refer to an operation of determining a beamforming matrix for each subcarrier of a signal transmitted by the beamformer 21 to the beamformee 22. In some example embodiments, the beamforming circuitry 21_2 may perform a beamforming operation by reflecting the channel smoothing-related phase information in the angle information $\phi$, $\Psi$ of the feedback frame. The beamforming circuitry 21_2 may use the channel smoothing-related phase information to reduce discontinuity of beamforming matrices HF corresponding to adjacent subcarriers, as shown in FIG. 2. Thereby, improving quality and reliability of communications between devices to improve an overall performance (e.g., increased signal to noise ratio, reduced disconnections, etc.). Meanwhile, in some example embodiments, the beamformer 21 may identify whether or not the feedback frame includes the channel smoothing-related phase information. The beamformer 21 may identify whether or not channel smoothing-related phase information is present, by identifying a particular field of the feedback frame or by identifying whether or not the channel smoothing-related phase information includes data indicating that the channel smoothing-related phase information is empty. When the feedback frame includes the channel smoothing-related phase information, the following operation may be performed.

For example, the beamforming circuitry 21_2 may generate an initial beamforming matrix for each subcarrier by using the angle information $\phi$, $\Psi$, and may generate a beamforming matrix for each subcarrier by applying the channel smoothing-related phase information to the initial beamforming matrix.

In summary, in the comparative example of FIG. 2, the discontinuity of the beamforming matrices HF may occur by the beamformee 22 generating, as in Equation 3, the beam steering matrix $Q_k$ by using the first diagonal matrix D, and thus, the beamformer 21 may reduce discontinuity of beamforming matrices by receiving, from the beamformee 22, phase information related to the first diagonal matrix D and reflecting the received phase information on a beamforming operation.

The beamformer 21 may transmit, to the beamformee 22 via the transceiver (not shown) and the first antennas AT_11 to AT_x1, a beamformed signal (or PPDU) according to the beamforming matrices determined by the beamforming circuitry 21_2. After performing channel smoothing on the beamformed signal, the beamformee 22 may process the beamformed signal.

Figure 4:
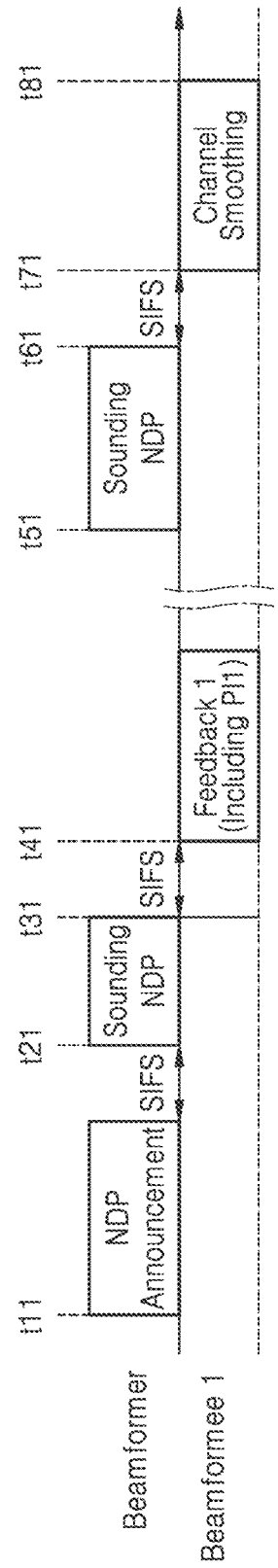
FIG. 4 is a timing diagram illustrating channel sounding according to some example embodiments.

FIG. 4 is a timing diagram illustrating channel sounding according to some example embodiments. In detail, the timing diagram of FIG. 4 illustrates channel sounding performed by a beamformer and a first beamformee. Channel sounding may be based on various protocol standards. In some example embodiments, the beamformer may be an access point, and the first beamformee may be a first station. FIG. 4 is only an example of some example embodiments, and thus, example embodiments are not limited to the channel sounding of FIG. 4.

Referring to FIG. 4, at a time t11, the beamformer may transmit an NDPA frame to the first beamformee. For example, the beamformer may transmit, to the first beamformee, the NDPA frame announcing transmission of a sounding NDP to acquire channel state information of a downlink. The NDPA frame may be a control frame, and the first beamformee may prepare for reception of the sounding NDP on the basis of the NDPA frame. In some example embodiments, the NDPA frame may include a subfield indicating whether or not the first beamformee is requested for first channel smoothing-related phase information PI1. The first beamformee may determine whether or not to feed the first channel smoothing-related phase information PI1 back to the beamformer, by identifying a value of the subfield of the NDPA frame. A detailed format of the NDPA frame will be described later with reference to FIG. 10.

At a time t21, the beamformer may transmit the sounding NDP to the first beamformee. For example, after transmitting the NDPA frame to the first beamformee, the beamformer may transmit the sounding NDP to the first beamformee after a short interframe space (SIFS) time. The first beamformee may estimate a first channel (or a first downlink channel) on the basis of the sounding NDP and generate information regarding the estimated first channel. In some example embodiments, the first beamformee may identify, via the subfield of the NDPA frame, that the first channel smoothing-related phase information PI1 is requested, and may generate the first channel smoothing-related phase information PI1. Here, the sounding NDP may be interchangeably referred to as an NDP.

At a time t41, the first beamformee may transmit a first feedback frame to the beamformer. For example, after an SIFS time from a time t31 after receiving the sounding NDP, the first beamformee may transmit, to the beamformer, the first feedback frame including information regarding the estimated first channel and the first channel smoothing-related phase information PI1.

At a time t51, the beamformer may transmit a smooth beamformed PPDU to the first beamformee on the basis of beamforming matrices determined by performing smooth beamforming by reflecting the first channel smoothing-related phase information PI1 in the information regarding the estimated first channel.

After an SIFS time from a time t61, from a time t71 to a time t81, the first beamformee may perform channel smoothing on the smooth beamformed PPDU and then process the smooth beamformed PPDU.

Figure 5:
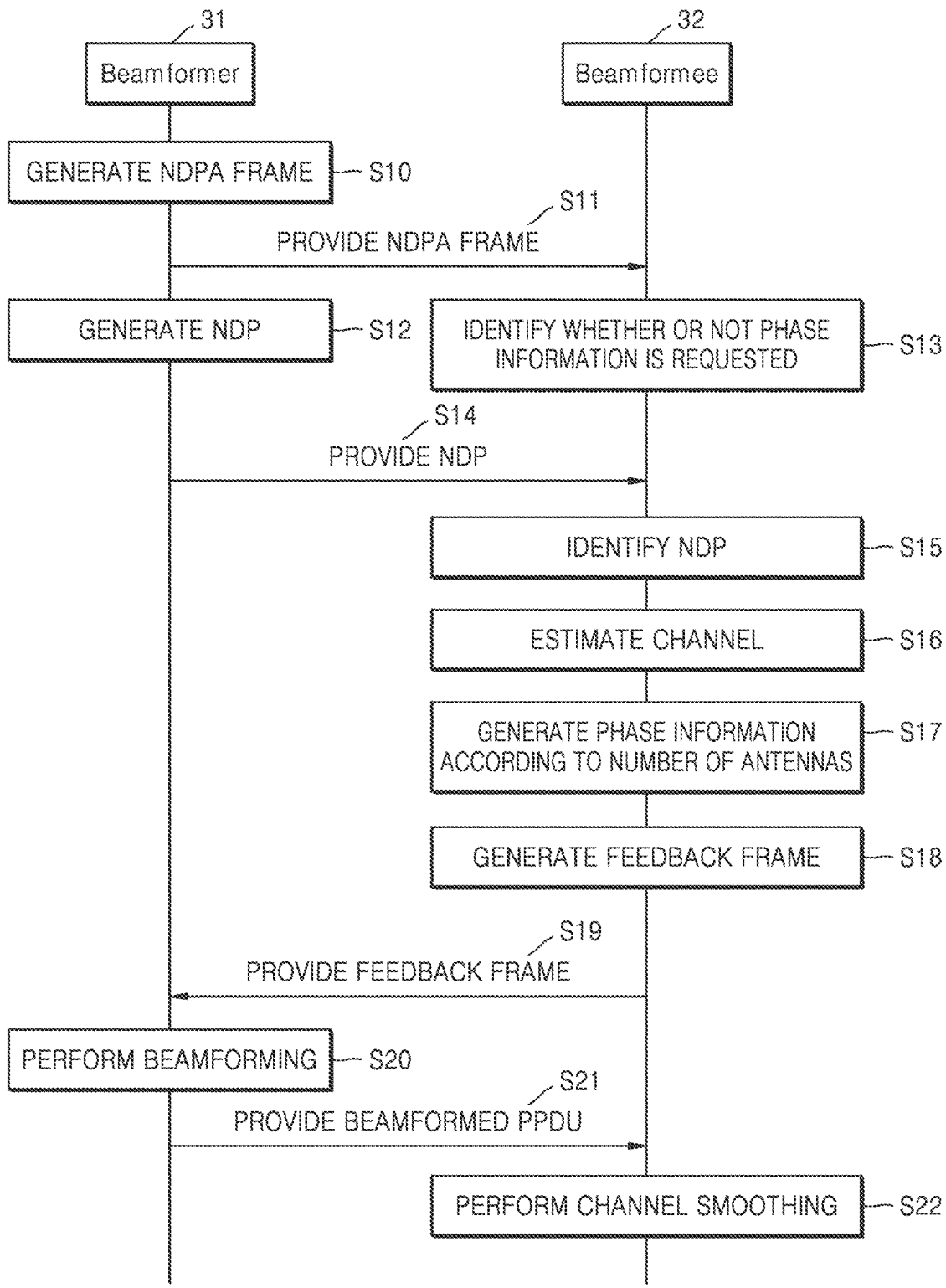
FIG. 5 is a message diagram illustrating a method for channel sounding according to some example embodiments.

FIG. 5 is a message diagram illustrating a method for channel sounding according to some example embodiments. In detail, the message diagram of FIG. 5 illustrates operations of a beamformer 31, which is an access point, and a beamformee 32, which is one of a plurality of stations, over time. As shown in FIG. 5, the method for channel sounding may include a plurality of operations S10 to S22.

Referring to FIG. 5, in operation S10, the beamformer 31 may generate an NDPA frame. For example, the beamformer 31 may select, from among associated beamformees, one beamformee 32 to perform channel sounding (or provide beamforming), and may generate the NDPA frame on the basis of the selected beamformee 32. The NDPA frame may include a control frame, and the beamformee 32 may prepare for reception of an NDP on the basis of the NDPA frame. In some example embodiments, the NDPA frame may include a plurality of fields, and any one of the plurality of fields may include a subfield indicating whether or not the beamformee 32 is requested for channel smoothing-related phase information.

In operation S11, the beamformer 31 may provide the NDPA frame to the beamformee 32. For example, the beamformer 31 may transmit, to the beamformee 32, a PPDU including the NDPA frame generated in operation S10, and the beamformee 32 may receive, from the beamformer 31, the PPDU including the NDPA frame.

In operation S12, the beamformer 31 may generate an NDP corresponding to the beamformee 32.

In operation S13, the beamformee 32 may identify, via the NDPA frame, whether or not the beamformer 31 requests the channel smoothing-related phase information. In some example embodiments, the beamformee 32 may recognize a protocol standard corresponding to a current NDPA frame by identifying a version of the NDPA frame. Accordingly, the beamformee 32 may recognize a protocol standard corresponding to the NDP subsequently received from the beamformer 31.

In operation S14, the beamformer 31 may provide the NDP to the beamformee 32.

In operation S15, the beamformee 32 may identify the NDP. In other words, the beamformee 32 may extract pieces of information (or pieces of data) included in fields of the NDP transmitted thereto from the beamformer 31.

In operation S16, the beamformee 32 may estimate a channel by using the pieces of information extracted from the fields of the NDP.

In operation S17, the beamformee 32 may generate the channel smoothing-related phase information according to the number of antennas thereof. In other words, the beamformee 32 may generate phase information by different methods according to the number of antennas thereof. The detailed description thereof will be given below with reference to FIGS. 6 and 7.

In operation S18, the beamformee 32 may generate a feedback frame including information regarding the estimated channel and the channel smoothing-related phase information.

In operation S19, the beamformee 32 may provide the feedback frame to the beamformer 31. For example, the feedback frame may include a field in which the channel smoothing-related phase information is arranged, and a field including a subfield having a value indicating whether or not the channel smoothing-related phase information is present.

In operation S20, the beamformer 31 may extract, from the feedback frame, the information regarding the estimated channel and the channel smoothing-related phase information, and may perform smooth beamforming by reflecting the channel smoothing-related phase information in the information regarding the estimated channel. For example, the beamformer 31 may identify, via some fields of the feedback frame, whether or not the channel smoothing-related phase information is present, and may acquire the channel smoothing-related phase information. For example, the beamformer 31 may acquire the channel smoothing-related phase information after identifying whether or not the channel smoothing-related phase information includes data indicating that the channel smoothing-related phase information is empty.

In operation S21, the beamformer 31 may provide the beamformee 32 with a beamformed PPDU on the basis of beamforming matrices for each subcarrier, which are determined in operation S20.

In operation S22, the beamformee 32 may perform channel smoothing on the beamforming matrices corresponding to the beamformed PPDU. Thereafter, the beamformee 32 may process the beamformed PPDU.

Figure 6:
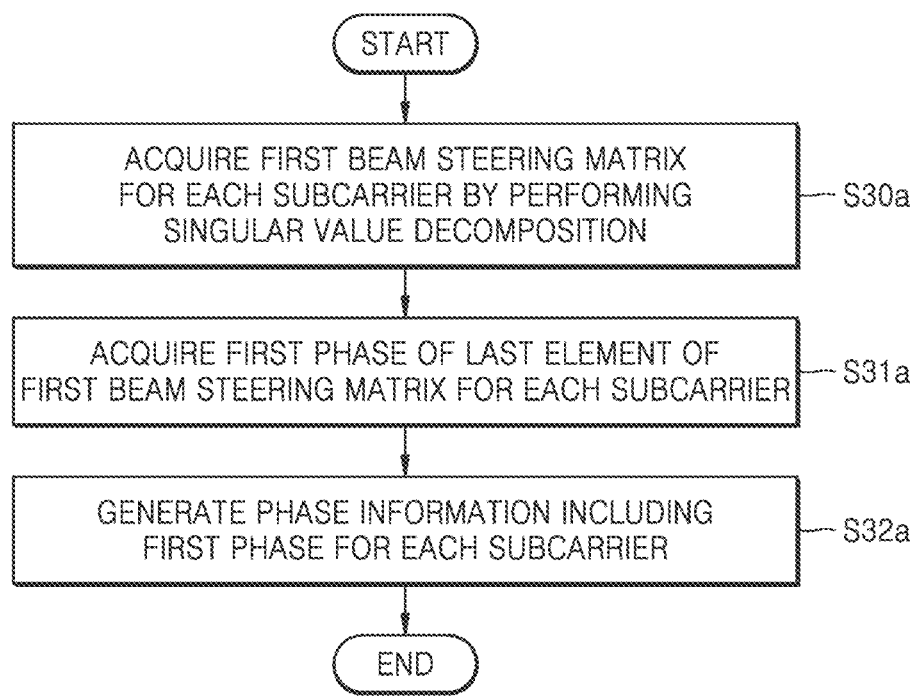
FIGS. 6 and 7 are flowcharts illustrating some example embodiments of operation S17 of FIG. 5.
Figure 7:
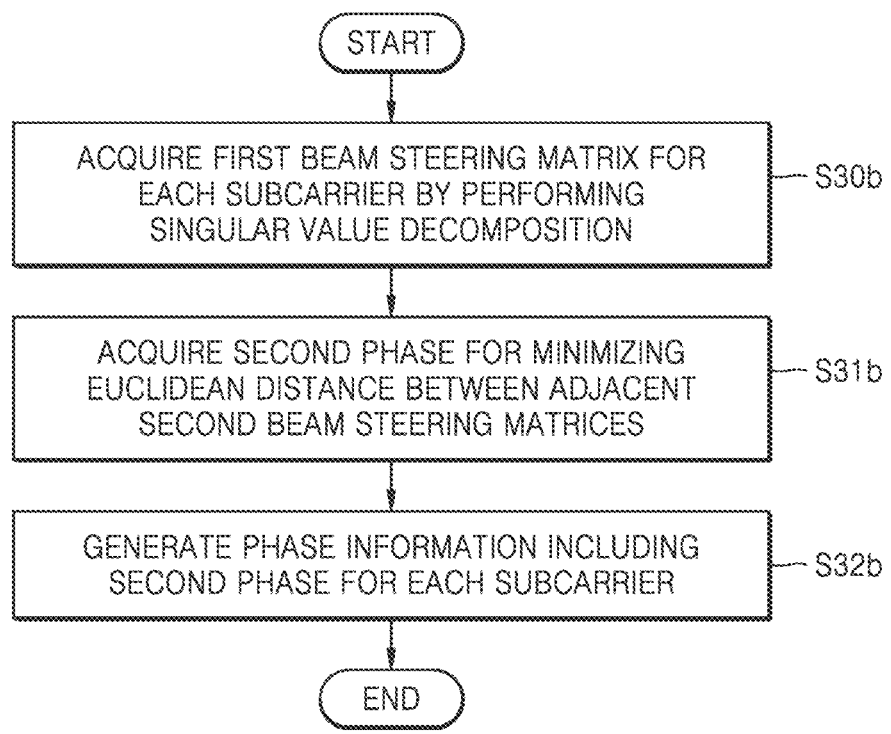

FIGS. 6 and 7 are flowcharts illustrating some example embodiments of operation S17 of FIG. 5. In detail, FIG. 6 illustrates that the beamformee 32 includes one antenna, and FIG. 7 illustrates that the beamformee 32 includes a plurality of antennas. However, FIGS. 6 and 7 are only embodiments, and the spirit of the inventive concepts are not limited thereto. Hereinafter, FIG. 5 may be further referred to.

Referring to FIG. 6, in operation S30a, the beamformee 32 may acquire an initial beam steering matrix for each subcarrier by performing singular value decomposition on an estimated channel. In operation S31a, the beamformee 32 may acquire a first phase of a last element of the initial beam steering matrix for each subcarrier. In detail, the beamformee 32 may acquire a first phase of at least one element corresponding to a last row of each column of the initial beam steering matrix for each subcarrier. In operation S32a, the beamformee 32 may generate channel smoothing-related phase information including the first phase for each subcarrier. For example, the channel smoothing-related phase information may include information corresponding to the first diagonal matrix D described above with reference to FIG. 3.

Referring to FIG. 7, in operation S30b, the beamformee 32 may acquire a beam steering matrix for each subcarrier by performing singular value decomposition on an estimated channel. As described above with reference to FIG. 3, the beam steering matrix may be generated from an initial beam steering matrix. In operation S31b, the beamformee 32 may acquire a second phase for minimizing an euclidean distance between adjacent beam steering matrices or maximizing a cross-correlation between adjacent beam steering matrices.

In some example embodiments, the beamformee 32 may use an euclidean distance between beam steering matrices (e.g., $Q_{k-1}$ and $Q_k$) of two adjacent subcarriers, which is obtained as in Equation 7.

$$D_k^{opt} = \arg\ min_{D_k} \|\tilde{Q}_{k-1} - Q_k D_k\|, \quad \text{[Equation 7]}$$

$$\text{where } D_k = \text{diag}\left(e^{j\phi_{N-r},1}, \ldots, e^{j\phi_{N_r},N_c}\right)$$

In Equation 7, is a norm operator, and $D_k^{opt}$ in which the euclidean distance between the beam steering matrices (e.g., $Q_{k-1}$ and $Q_k$) of adjacent subcarriers is minimized may be obtained. Hereinafter, a beam steering matrix may be expressed as, $Q_k = [q_{1,k}, q_{2,k}, \ldots q_{N_c,k}]$ $D_k^{opt}$ is a third diagonal matrix, and may be sequentially obtained for all subcarriers (k=0, 1, ..., $N_{FFT}$).

In some example embodiments, the beamformee 32 may use a cross-correlation between beam steering matrices (e.g., $Q_{k-1}$ and $Q_k$) of two adjacent subcarriers, which is obtained as in Equation 8.

$$D_k^{opt} = \arg\ max_{D_k} XCor(\tilde{Q}_{k-1}, Q_k D_k), \quad \text{[Equation 8]}$$

$$\text{where } D_k = \text{diag}\left(e^{j\phi_{N_r},1}, \ldots, e^{j\phi_{N_r},N_c}\right)$$

As in Equation 8, $D_k^{opt}$ in which a cross-correlation between beam steering matrices (e.g., $Q_{k-1}$ and $Q_k$) of adjacent subcarriers is maximized may be obtained.

The beamformee 32 may sequentially obtain, on the basis of Equation 7 or Equation 8, the third diagonal matrix $D_k^{opt}$ for all subcarriers (k=0, 1, ..., $N_{FFT}$). For example, when obtaining $D_k^{opt}$ for a $k^{th}$ subcarrier by using Equation 7 or Equation 8, a previously obtained $D_{k-1}^{opt}$ may be reflected in a beam steering matrix $Q_{k-1}$ of a k–1$^{st}$ subcarrier and expressed as $\tilde{Q}_{k-1}$. In some example embodiments, a beamformee may generate second phases of elements of $D_k^{opt}$ for each subcarrier as channel smoothing-related phase information.

Solutions of Equation 7 and Equation 8 may be defined as in Equation 9.

$$e^{j\phi_i^{opt}} = \frac{q_{i,k}^h \tilde{q}_{i,k-1}}{|q_{i,k}^h \tilde{q}_{i,k-1}|} \quad \text{[Equation 9]}$$

In some example embodiments, the second phases may include $\emptyset_i^{opt}$.

In operation S32b, the beamformee 32 may generate channel smoothing-related phase information including the second phases.

Figure 8A:
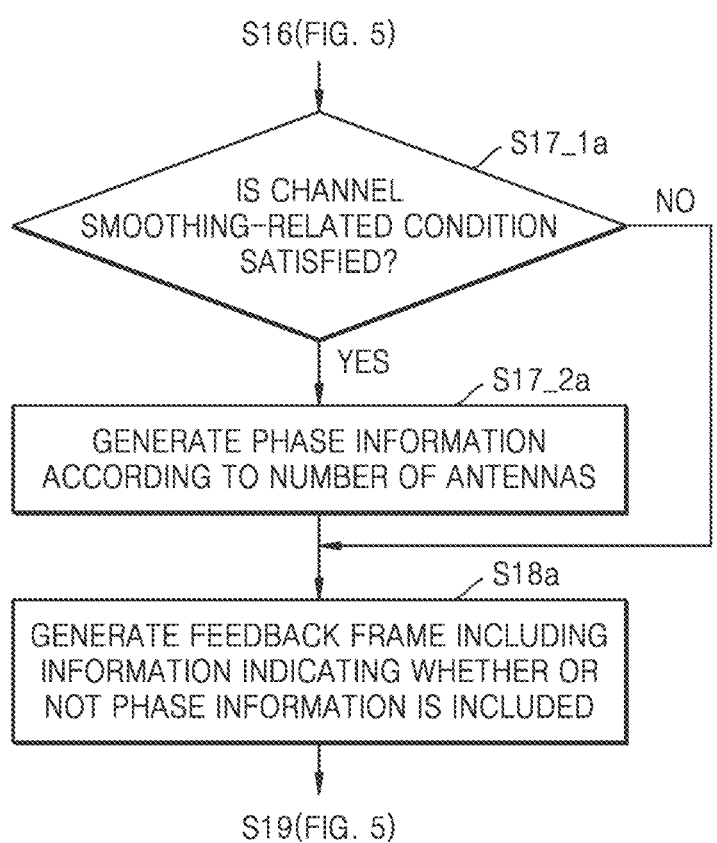
FIGS. 8A and 8B are flowcharts illustrating some example embodiments of operation S17 of FIG. 5.
Figure 8B:
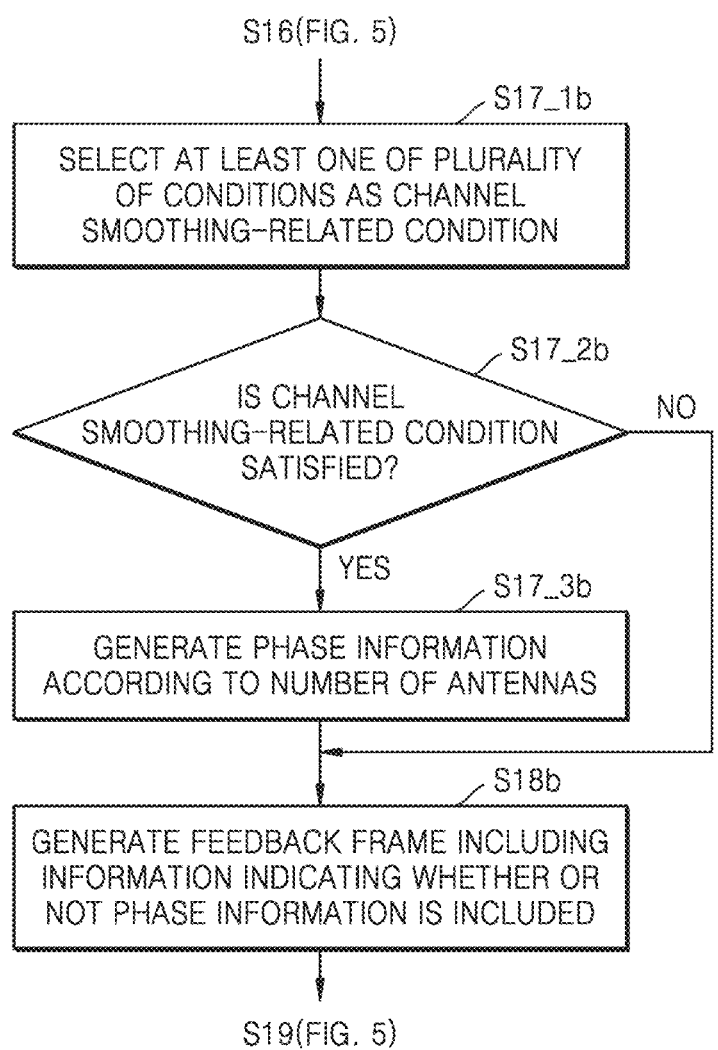

FIGS. 8A and 8B are flowcharts illustrating some example embodiments of operation S17 of FIG. 5. Hereinafter, FIG. 5 may be further referred to.

Referring to FIG. 8A, in operation S17_1a subsequent to operation S16 of FIG. 5, the beamformee 32 may determine, on the basis of an estimated channel, whether or not a channel smoothing-related condition is satisfied.

In some example embodiments, the beamformee 32 may determine whether or not a channel smoothing-related condition is satisfied, on the basis of an euclidean distance between beam steering matrices (e.g., $Q_{k-1}$ and $Q_k$) of two adjacent subcarriers, which is obtained as in Equation 10.

$$M_k^1 = \|Q_{k-1} - Q_k\| \quad (10)$$

$M_k^1$ denotes an euclidean distance between beam steering matrices $Q_k$ and $Q_{k-1}$ of each of a $k^{th}$ subcarrier and a k–1$^{st}$ subcarrier adjacent thereto. The beamformee 32 may determine whether or not each subcarrier satisfies a first condition of Equation 11.

$$M_k^1 \geq TH_1 \quad (11)$$

The beamformee 32 may determine whether or not an euclidean distance $M_k^1$ calculated for each subcarrier is greater than or equal to a first reference value $TH_1$. When the euclidean distance $M_k^1$ is greater than or equal to the first reference value $TH_1$, the beamformee 32 determine that a corresponding subcarrier satisfies the channel smoothing-related condition.

In some example embodiments, the beamformee 32 may determine whether or not the channel smoothing-related condition is satisfied, on the basis of a cross-correlation between beam steering matrices (e.g., $Q_{k-1}$ and $Q_k$) of two adjacent subcarriers, which is obtained as in Equation 12.

$$M_k^2 = XCor(Q_{k-1}, Q_k), \quad (12)$$

$M_k^2$ denotes a cross-correlation between the beam steering matrices ($Q_k$ and $Q_{k-1}$) of each of the $k^{th}$ subcarrier and the k–1$^{st}$ subcarrier adjacent thereto. The beamformee 32 may determine whether or not each subcarrier satisfies a second condition of Equation 13.

$$M_k^2 \leq TH_2 \quad (13)$$

The beamformee 32 may determine whether or not the cross-correlation $M_k^2$ calculated for each subcarrier is less than or equal to a second reference value $TH_2$. When the cross-correlation $M_k^2$ is less than or equal to the second reference value $TH_2$, the beamformee 32 may determine that a corresponding subcarrier satisfies the channel smoothing-related condition.

However, the above description is some example embodiments and not limited thereto, and in addition to the first and second conditions, at least one of various conditions may be set as a channel smoothing-related condition.

When the channel smoothing-related condition is satisfied in operation S17_1a, in operation S17_2a, the beamformee 32 may generate channel smoothing-related phase information according to the number of antennas. In some example embodiments, the beamformee 32 may generate channel smoothing-related phase information including phase information generated for each subcarrier.

After operation S17_2a or when the channel smoothing-related condition is not satisfied in operation S17_1a, in operation S18a, the beamformee 32 may generate a feedback frame including information indicating whether or not the channel smoothing-related phase information is included. In some example embodiments, in operation S18a after operation S17_2a, the beamformee 32 may arrange, in a first particular field of the feedback frame, the information indicating that the channel smoothing-related phase information is included, and may arrange the channel smoothing-related phase information in a second particular field of the feedback frame. In some example embodiments, when the channel smoothing-related condition is not satisfied in operation S17_1a, in operation S18a, the beamformee 32 may arrange, in the first particular field of the feedback frame, information indicating that the channel smoothing-related phase information is not included, and may arrange, in the second particular field of the feedback frame, data indicating that the channel smoothing-related phase information is empty information. In some example embodiments, the data may have a certain pattern agreed between the beamformee 32 and the beamformer 31. Operation S19 of FIG. 5 is subsequently performed.

Referring further to FIG. 8B, in operation S17_1*b* after operation S16 of FIG. 5, the beamformee 32 may select at least one of a plurality of conditions as a channel smoothing-related condition. In some example embodiments, the beamformee 32 may select at least one of a plurality of conditions as a channel smoothing-related condition on the basis of a communication state with the beamformer 31. For example, the beamformee 32 may operate on the basis of a rougher channel smoothing-related condition by selecting only any one of a plurality of conditions as a channel smoothing-related condition when the communication state with the beamformer 31 is of high quality, and may operate on the basis of stricter channel smoothing-related conditions by selecting two or more of the plurality of conditions as channel smoothing-related conditions when the communication state with the beamformer 31 is poor. However, the above description is an example, and thus, the beamformee 32 may select two or more of a plurality of conditions as channel smoothing-related conditions when the communication state with the beamformer 31 is of high quality, and may select only any one of the plurality of conditions as a channel smoothing-related condition when the communication state with the beamformer 31 is poor.

In operation S17_2*b*, the beamformee 32 may determine whether or not the channel smoothing-related condition is satisfied, on the basis of the channel smoothing-related condition determined in operation S17_1*b*.

When the channel smoothing-related condition is satisfied in operation S17_2*b*, in operation S17_3*b*, the beamformee 32 may generate channel smoothing-related phase information according to the number of antennas.

After operation S17_3*b* or when the channel smoothing-related condition is not satisfied in operation S17_2*b*, in operation S18*b*, the beamformee 32 may generate a feedback frame including information indicating whether or not the channel smoothing-related phase information is included. Operation S19 of FIG. 5 is subsequently performed.

Figure 9:
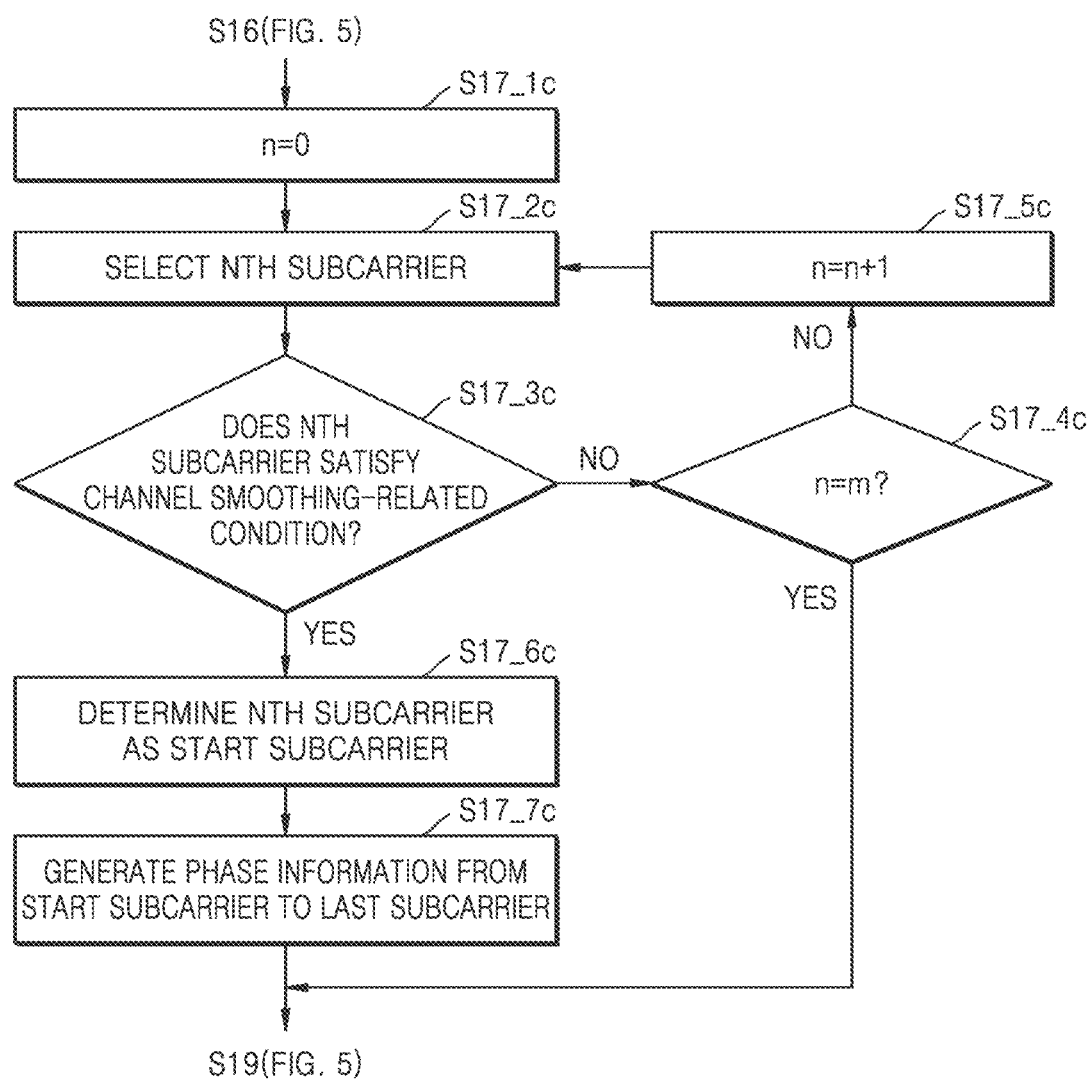
FIG. 9 is a flowchart illustrating some example embodiments of operation S17 of FIG. 5.

FIG. 9 is a flowchart illustrating some example embodiments of operation S17 of FIG. 5. Hereinafter, FIG. 5 may be further referred to.

Referring to FIG. 9, after operation S16 of FIG. 5, in operation S17_1*c*, the beamformee 32 sets n to 0. n denotes an index of a subcarrier, and m subcarriers may be arranged in index order. In operation S17_2*c*, the beamformee 32 may select an $n^{th}$ subcarrier from among subcarriers. In operation S17_3*c*, the beamformee 32 may determine whether or not the $n^{th}$ subcarrier satisfies a channel smoothing-related condition. When the $n^{th}$ subcarrier does not satisfy the channel smoothing-related condition in operation S17_3*c*, in operation S17_4*c*, the beamformee 32 may determine whether or not n is the same as m. When n is not the same as m in operation S17_4*c*, in operation S17_5*c*, the beamformee 32 may count up n, and may perform operation S17_2*c*.

When the $n^{th}$ subcarrier satisfies the channel smoothing-related condition in operation S17_3*c*, in operation S17_6*c*, the beamformee 32 may determine the $n^{th}$ subcarrier as a start subcarrier. In operation S17_7*c*, the beamformee 32 may generate channel smoothing-related phase information including pieces of phase information from the start subcarrier to a last subcarrier. In some example embodiments, the channel smoothing-related phase information may include information indicating the start subcarrier, and the pieces of phase information from the start subcarrier to the last subcarrier.

Meanwhile, when n is the same as m in operation S17_4*c*, the beamformee 32 may generate the channel smoothing-related phase information including data indicating that the channel smoothing-related phase information is empty information.

Operation S19 of FIG. 5 is subsequently performed.

Figure 10:
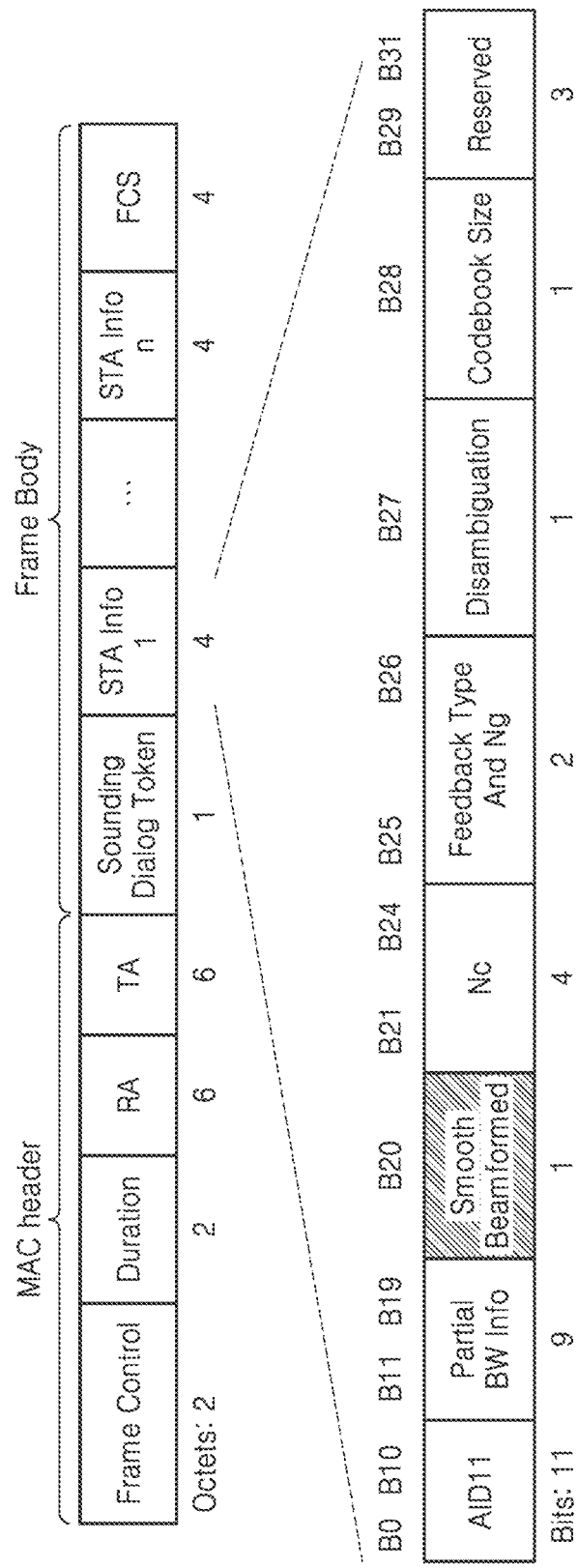
FIG. 10 is a view illustrating a null data packet announcement (NDPA) frame according to some example embodiments.

FIG. 10 is a view illustrating an NDPA frame according to some example embodiments.

Referring to FIG. 10, the NDPA frame may include (e.g., may be implemented as) a media access control (MAC) header, a frame body, and/or a frame check sequence (FCS) field. The NDPA frame may include, in the MAC header, a frame control field, a duration field, an RA field, and a TA field, and may include, in the frame body, a sounding dialog token field and/or n STA information fields (wherein n is an integer greater than 0). The NDPA frame may include information used by beamformees to perform channel sounding.

The frame control field may include information regarding a version of a MAC protocol and/or other additional control information. The duration field may include time information for setting a network allocation vector (NAV), or information regarding an identifier (e.g., an association identifier (AID)) of a user. The RA field may include address information of a beamformee receiving the NDPA frame, and the TA field may include address information of a beamformer transmitting the NDPA frame. The sounding dialog token field may be referred to as a sounding sequence field, and may include identification information regarding the NDPA frame as described below. The STA information fields may be referred to as user information fields, and the NDPA frame may include first to $n^{th}$ STA information fields corresponding to first to $n^{th}$ beamformees receiving the NDPA frame.

In some example embodiments, the first STA information field may include an AID11 field in which information regarding an identifier (AID11) for a first STA (or a first user) is arranged, a Partial BW Info field in which partial bandwidth information is arranged, a Smooth Beamformed field having arranged therein information regarding whether or not channel smoothing-related phase information is requested, an Nc field in which information regarding the number of subcarriers is arranged, a Feedback Type and Ng field in which information regarding a feedback type is arranged, a Disambiguration field, a Codebook Size field, and a Reserved field. In detail, a beamformee (or a station) subject to the first STA information field may identify, with reference to the Smooth Beamformed field, whether or not a beamformer requests channel smoothing-related phase information. A structure of the first STA information field may also be applied to structures of the other STA information fields.

Figure 12:
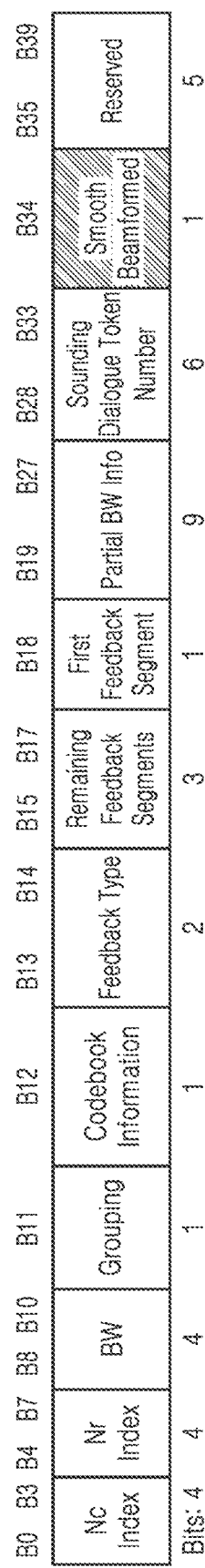
FIG. 12 is a view illustrating a structure of an extremely high throughput (EHT) multi-input multi-output (MIMO) Control field of FIG. 11.

FIG. 11 is a table diagram illustrating information included in a feedback frame according to some example embodiments, and FIG. 12 is a view illustrating a structure of an EHT MIMO Control field of FIG. 11. Hereinafter, the feedback frame is based on an EHT protocol standard, but is only an example of some example embodiments. Therefore, the feedback frame is not limited thereto, and may be implemented in a format based on various protocol standards including an EHT+ protocol standard. Meanwhile, the detailed description of fields and subfields in FIGS. 11 and 12 is given in IEEE 802.11be, and thus is omitted herein.

Referring to FIG. 11, a feedback frame generated by a beamformee may include (e.g., may be implemented as) a Category field, an EHT Action field, an EHT MIMO Control field, an EHT Compressed Beamforming Report field, an EHT MU Exclusive Beamforming Report field, an EHT CQI Report field, and/or an EHT Smooth Beamforming Report field that are arranged in order. In some example embodiments, channel smoothing-related phase information generated by a beamformee, according to some example embodiments, may be arranged in the EHT Smooth Beamforming Report field.

Referring further to FIG. 12, the EHT MIMO Control field may include an Nc Index subfield, an Nr Index subfield, a BW subfield, a Grouping subfield, a Codebook Information subfield, a Feedback Type subfield, a Remaining Feedback Segments subfield, a First Feedback Segment subfield, a Partial BW Info subfield, a Sounding Dialogue Token Number subfield, and/or a Smooth Beamformed subfield. In some example embodiments, the Smooth Beamformed subfield may have a value indicating whether or not phase information of the beamformee is present. For example, when the EHT Smooth Beamforming Report field includes phase information, the value of the Smooth Beamformed subfield may be set to 1. When the EHT Smooth Beamforming Report field does not include phase information, the value of the Smooth Beamformed subfield may be set to 0. A beamformer (or an access point) may identify, with reference to the EHT MIMO Control field of the feedback frame, whether or not the phase information of the beamformee is present, and may acquire the phase information from the EHT Smooth Beamforming Report field of the feedback frame when identifying that the phase information is present.

FIG. 13 is a table diagram illustrating a structure of the EHT Smooth Beamforming Report field of FIG. 11.

Referring to FIG. 13, the EHT Smooth Beamforming Report field may include a Start Subcarrier Index subfield and/or a Smooth Beamforming Information subfield for each subcarrier corresponding to channel smoothing-related phase information for each subcarrier.

In some example embodiments, a size of the Start Subcarrier Index subfield may be set to 16 bits. However, the size of the Start Subcarrier Index subfield is only an example of some example embodiments, and is not limited thereto. Therefore, the size of the Start Subcarrier Index subfield may be set to match the number of subcarriers used for communication between the beamformer and the beamformee.

In some example embodiments, the Smooth Beamforming Information subfield for each subcarrier may be set to bits corresponding to a result obtained by dividing, by 2, the product between the number $N^c$ of subcarriers and the number $b_\varphi$ of bits of channel smoothing-related phase information of a corresponding subcarrier.

In some example embodiments, the beamformer may identify a start subcarrier satisfying a channel smoothing-related condition by referring to the Start Subcarrier Index subfield, and may acquire channel smoothing-related phase information from the Smooth Beamforming Information subfields corresponding to the start subcarrier and subcarriers after the start subcarrier. The beamformer may perform smooth beamforming on the basis of the acquired channel smoothing-related phase information.

FIG. 14 is a table diagram illustrating a structure of the EHT Smooth Beamforming Report field of FIG. 11.

Referring to FIG. 14, channel smoothing-related phase information included in the EHT Smooth Beamforming Report field may include information regarding a size of an initial beam steering matrix V (or a beam steering matrix Q), information regarding the number of angles (or phases), and/or phase values for respective subcarriers. As described above, Nr may denote the number of antennas of a beamformee, $N_c$ may denote the number of subcarriers, and k may denote an index of a subcarrier. Meanwhile, the channel smoothing-related phase information of FIG. 14 may be arranged according to the EHT Smooth Beamforming Report field described above with reference to FIG. 13.

FIG. 15 is a table diagram illustrating a subfield of an EHT PHY Capabilities Information field indicating whether or not smooth beamforming feedback may be supported, according to some example embodiments. Whether or not smooth beamforming feedback may be supported indicates whether or not a beamformer may request a feedback frame including channel smoothing-related phase information according to some example embodiments, and whether or not a beamformee may generate the feedback frame.

Referring to FIG. 15, the EHT PHY Capabilities Information field defined in the standard protocol of IEEE 802.11be may include a subfield indicating whether or not smooth beamforming feedback may be supported. For example, when the beamformer may support reception of smooth beamforming information feedback including channel smoothing-related phase information, the corresponding subfield may be set to 1. In addition, as an example, when a beamformee, which may support transmission of smooth beamforming information feedback including channel smoothing-related phase information, is not present, the corresponding subfield may be set to 0.

Figure 16A:
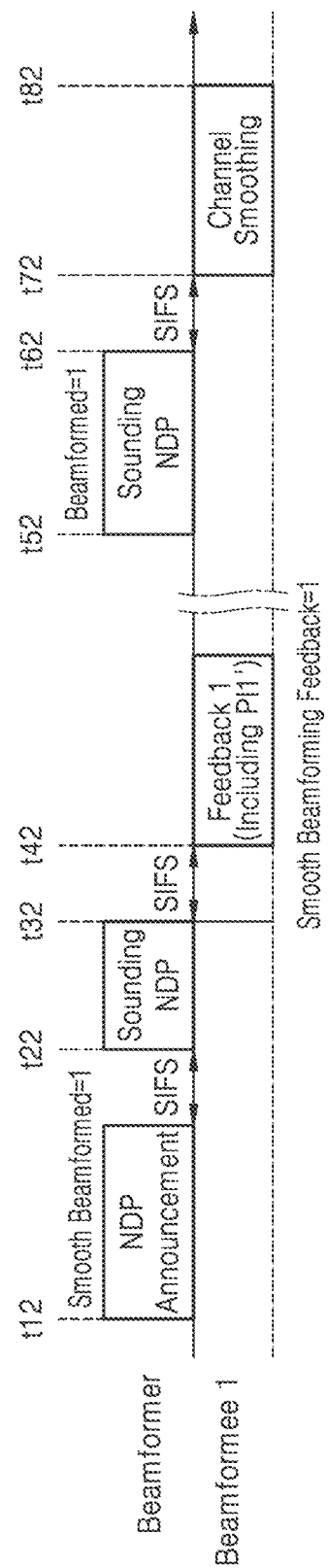
FIGS. 16A and 16B are timing diagrams illustrating channel sounding in detail, according to some example embodiments.
Figure 16B:
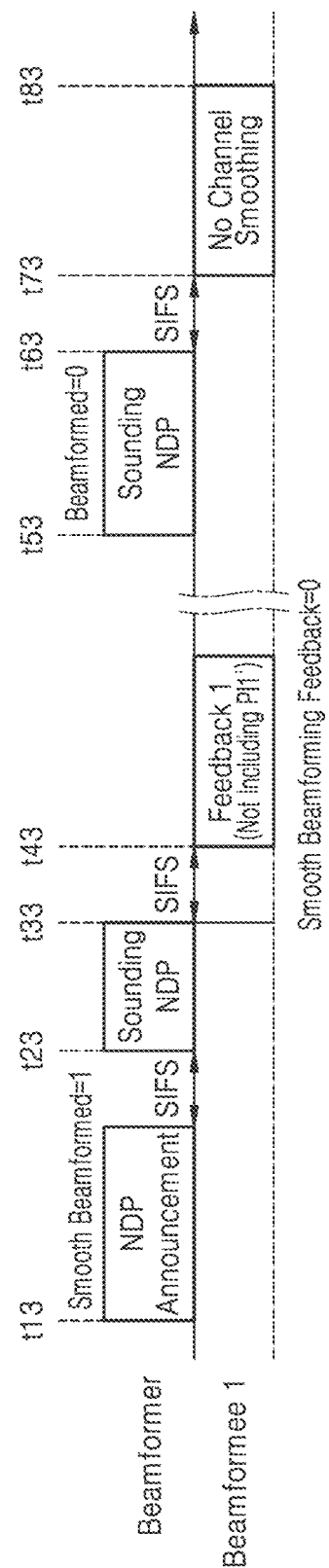

FIGS. 16A and 16B are timing diagrams illustrating channel sounding in detail, according to some example embodiments.

Referring to FIG. 16A, at a time t12, a beamformer may transmit an NDPA frame to a first beamformee. In detail, the NDPA frame may include a Smooth Beamformed field that may be set to 1 to request the first channel smoothing-related phase information PI1' from the first beamformee.

At a time t22, the beamformer may transmit a sounding NDP to the first beamformee. After transmitting the NDPA frame to the first beamformee, the beamformer may transmit the sounding NDP to the first beamformee after an SIFS time. The first beamformee may estimate a first channel on the basis of the sounding NDP and generate information regarding the estimated first channel. Meanwhile, when the Smooth Beamforming Feedback subfield of FIG. 15 related to the first beamformee is set to 1, the first beamformee may determine, on the basis of the estimated first channel, whether or not a channel smoothing-related condition is satisfied, and may generate the first channel smoothing-related phase information PI1' on the basis of a result of the determination.

After an SIFS time from a time t32, at a time t42, the first beamformee may transmit, to the beamformer, a first feedback frame including the first channel smoothing-related phase information PI1'.

At a time t52, the beamformer may transmit a smooth beamformed PPDU to the first beamformee, on the basis of matrices determined by performing smooth beamforming on the basis of the first channel smoothing-related phase information PIP. The beamformer may set a Beamformed field of the PPDU to 1 to notify the first beamformee that the corresponding PPDU is smooth beamformed.

After an SIFS time from a time t62, from a time t72 to a time t82, the first beamformee may perform channel smoothing on the smooth beamformed PPDU by identifying that the Beamformed field of the PPDU is 0, and then may process the smooth beamformed PPDU.

Referring further to FIG. 16B, at a time t13, a beamformer may transmit an NDPA frame to a first beamformee. In detail, the NDPA frame may include a Smooth Beamformed field that may be set to 1 to request first channel smoothing-related phase information PI1' from the first beamformee.

At a time t23, the beamformer may transmit a sounding NDP to the first beamformee. After transmitting the NDPA frame to the first beamformee, the beamformer may transmit the sounding NDP to the first beamformee after an SIFS time. The first beamformee may estimate a first channel on the basis of the sounding NDP and generate information regarding the estimated first channel.

Meanwhile, when the Smooth Beamforming Feedback subfield of FIG. 15 related to the first beamformee is set to 0, the first beamformee may not generate the channel smoothing-related phase information PI1'.

After an SIFS time from a time t33, at a time t43, the first beamformee may transmit, to the beamformer, a first feedback frame not including the first channel smoothing-related phase information PI1'. The first feedback frame may include only the information regarding the estimated first channel.

At a time t53, the beamformer may transmit a smooth beamformed PPDU to the first beamformee on the basis of matrices determined by performing smooth beamforming on the basis of the first feedback frame. The beamformer may set a Beamformed field of the PPDU to 0 to notify the first beamformee that the corresponding PPDU is not smooth beamformed, to prevent the first beamformee from performing channel smoothing.

After an SIFS time from a time t63, from a time t73 to a time t83, the first beamformee may process the smooth beamformed PPDU without performing channel smoothing on the smooth beamformed PPDU by identifying that the Beamformed field of the PPDU is 0.

However, the descriptions of FIGS. 16A and 16B are only embodiments, and thus, the spirit of the inventive concepts are not limited thereto.

Figure 17:
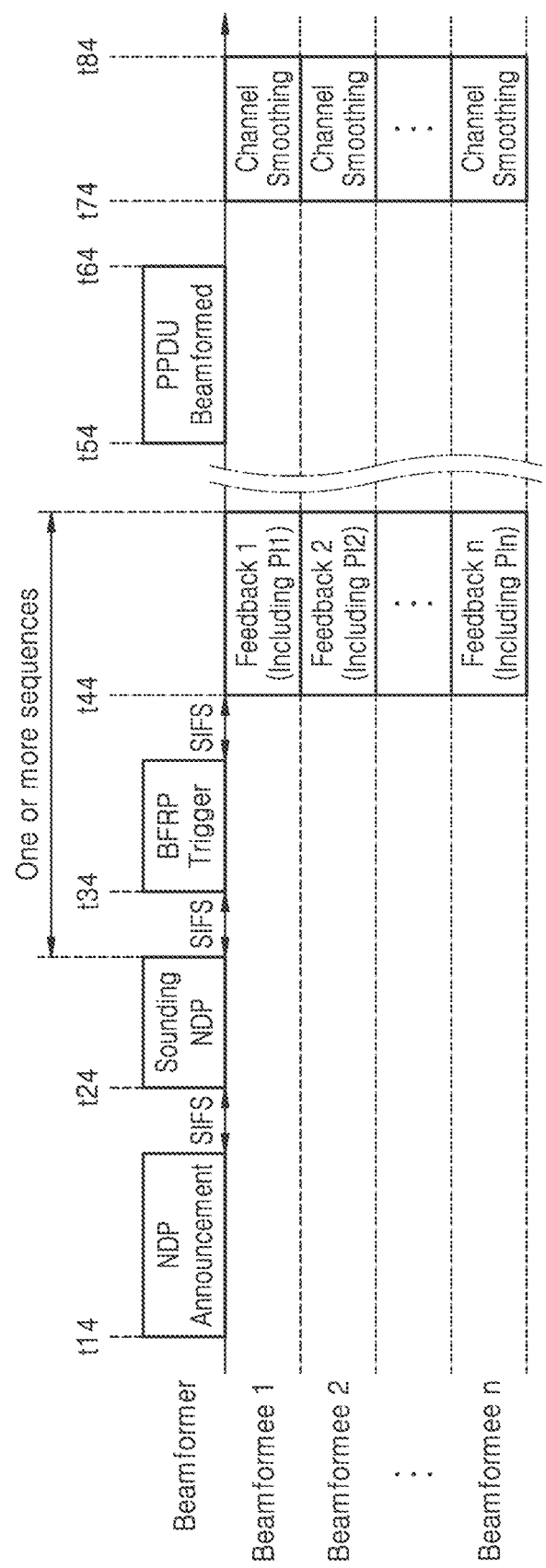
FIG. 17 is a timing diagram illustrating channel sounding according to some example embodiments.

FIG. 17 is a timing diagram illustrating channel sounding according to some example embodiments. In detail, the timing diagram of FIG. 17 illustrates channel sounding performed by a beamformer and first to $n^{th}$ beamformees (wherein n is an integer greater than 1). In the example of FIG. 17, the first to $n^{th}$ beamformees may support the same or different protocol standards, respectively. In some example embodiments, the beamformer may be an access point, and each of the first to $n^{th}$ beamformees may be a station. Embodiments are not limited to the channel sounding of FIG. 17.

Referring to FIG. 17, at a time t14, the beamformer may transmit an NDPA frame to the first to $n^{th}$ beamformees. The first to $n^{th}$ beamformees may prepare for reception of a sounding NDP on the basis of the NDPA frame. In some example embodiments, the NDPA frame may include subfields indicating whether or not the first to $n^{th}$ beamformees are requested for first to $n^{th}$ channel smoothing-related phase information PI1 to PIn.

At a time t24, the beamformer may transmit the sounding NDP to the first to $n^{th}$ beamformees. For example, after transmitting the NDPA frame to the first to $n^{th}$ beamformees, the beamformer may transmit the sounding NDP to the first to $n^{th}$ beamformees after an SIFS time. In some example embodiments, the sounding NDP may include first to $n^{th}$ NDPs corresponding to the first to $n^{th}$ beamformees, respectively, and the first to $n^{th}$ NDPs may be aggregated in different bands. The first to $n^{th}$ beamformees may estimate first to $n^{th}$ channels (or first to $n^{th}$ downlink channels), respectively, on the basis of the sounding NDP, and may generate information regarding the estimated first to $n^{th}$ channels. In some example embodiments, the first to $n^{th}$ beamformees may respectively identify, from subfields of the NDPA frame, that the first to $n^{th}$ channel smoothing-related phase information PI1 to PIn are requested, and may generate the first to $n^{th}$ channel smoothing-related phase information PI1 to PIn, respectively. In some example embodiments, some of the first to $n^{th}$ beamformees may not support an operation of generating channel smoothing-related phase information or a channel smoothing operation, and in this case, some of the first to $n^{th}$ beamformees may generate a feedback frame not including corresponding channel smoothing-related phase information.

At a time t34, the beamformer may transmit a beamforming report poll (BFRP) trigger frame to the first to $n^{th}$ beamformees. For example, after transmitting the sounding NDP to the first to $n^{th}$ beamformees, the access point may provide, after an SIFS time, the first to $n^{th}$ beamformees with the BFRP trigger frame for triggering uplink transmissions of the first to $n^{th}$ beamformees. The BFRP trigger frame may include information needed for the first to $n^{th}$ beamformees to transmit the feedback frame to the beamformer, e.g., the access point. For example, the BFRP trigger frame may include information regarding resources to be used in uplink transmission.

After receiving the BFRP trigger frame, at a time t44 after an SIFS time, the first to $n^{th}$ beamformees may transmit first to $n^{th}$ feedback frames to the beamformer. At least one of the first to $n^{th}$ feedback frames may include channel smoothing-related phase information according to the above-described embodiments. In some example embodiments, the first to $n^{th}$ feedback frames may be aggregated in different bands. In some example embodiments, the first to $n^{th}$ feedback frames may be transmitted in bands corresponding to bands in which first to $n^{th}$ NDPs are transmitted. For example, the first feedback frame may be transmitted in a band in which the first NDP is transmitted.

At a time t54, the beamformer may transmit a smooth beamformed PPDU to the first to $n^{th}$ beamformees on the basis of beamforming matrices determined by performing smooth beamforming on the first to $n^{th}$ beamformees by using the first to $n^{th}$ channel smoothing-related phase information PI1 to PIn included in the first to $n^{th}$ feedback frames. In some example embodiments, the smooth beamformed PPDU may include first to $n^{th}$ PPDUs corresponding to the first to $n^{th}$ beamformees, respectively, and the first to $n^{th}$ PPDUs may be aggregated in different bands.

After a certain time from a time t64, from a time t74 to a time t84, the first to $n^{th}$ beamformees may perform channel smoothing on the first to $n^{th}$ PPDUs, respectively. In some example embodiments, from among the first to $n^{th}$ beamformees, a beamformee, which does not support channel smoothing, may not perform channel smoothing.

Figure 18:
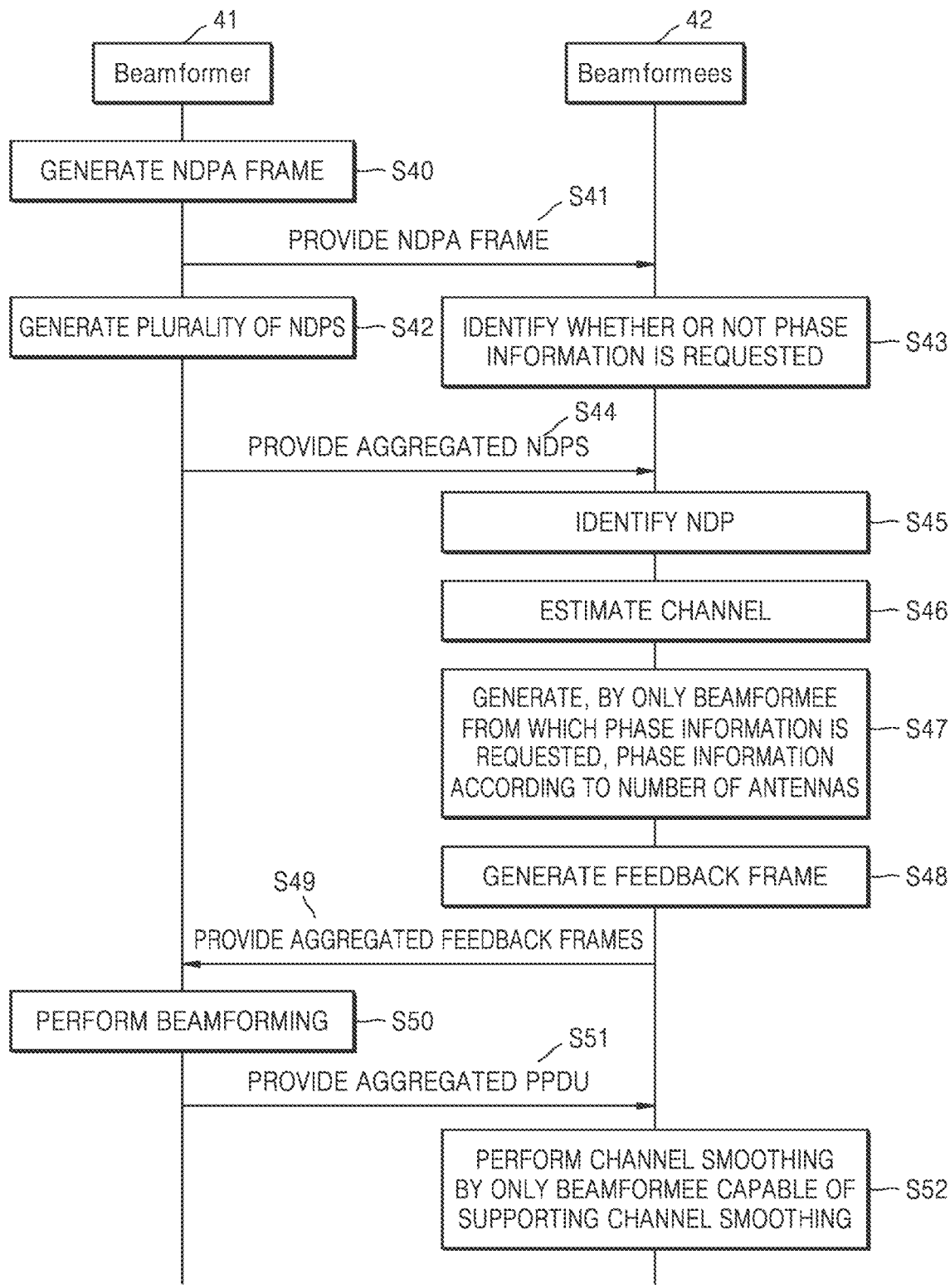
FIG. 18 is a message diagram illustrating a method for channel sounding according to some example embodiments.

FIG. 18 is a message diagram illustrating a method for channel sounding according to some example embodiments. As illustrated in FIG. 18, the method for channel sounding may include a plurality of operations S40 to S52.

Referring to FIG. 18, in operation S40, a beamformer 41 may generate an NDPA frame. For example, the beamformer 41 may select, from among associated beamformees, a plurality of beamformees 42 to perform channel sounding, and may generate the NDPA frame on the basis of the selected beamformees 42. In some example embodiments, the NDPA frame may include subfields indicating whether or not each of the beamformees 42 is requested for channel smoothing-related phase information.

In operation S41, the beamformer 41 may provide the NDPA frame to the beamformees 42.

In operation S42, the beamformer 41 may generate a plurality of NDPs corresponding to the beamformees 42, respectively.

In operation S43, the beamformees 42 may respectively identify, with reference to the NDPA frame, whether or not the beamformer 41 requests the channel smoothing-related phase information from the beamformees 42.

In operation S44, the beamformer 41 may provide the beamformees 42 with NDPs respectively aggregated in different bands.

In operation S45, each of the beamformees 42 may identify an NDP thereof from among the aggregated NDPs.

In operation S46, each of the beamformees 42 may estimate a channel thereof by using the identified NDP thereof.

In operation S47, from among the beamformees 42, only a beamformee from which phase information is requested may generate channel smoothing-related phase information according to the number of antennas.

In operation S48, each of the beamformees 42 may generate a feedback frame.

In operation S49, the beamformees 42 may provide the beamformer 41 with feedback frames aggregated in different bands, respectively.

In operation S50, the beamformer 41 may perform, on the basis of the feedback frames, smooth beamforming on the beamformees 42. The beamformer 41 may perform smooth beamforming reflecting channel smoothing-related phase information, with respect to a feedback frame including the channel smoothing-related phase information.

In operation S51, the beamformer 41 may provide, on the basis of beamforming matrices determined in operation S50, the beamformees 42 with a PPDU in which a plurality of PPDUs are respectively aggregated in different bands.

In operation S52, from among the beamformees 42, only a beamformee, which may support channel smoothing, may perform channel smoothing on the PPDU thereof.

Figure 19:
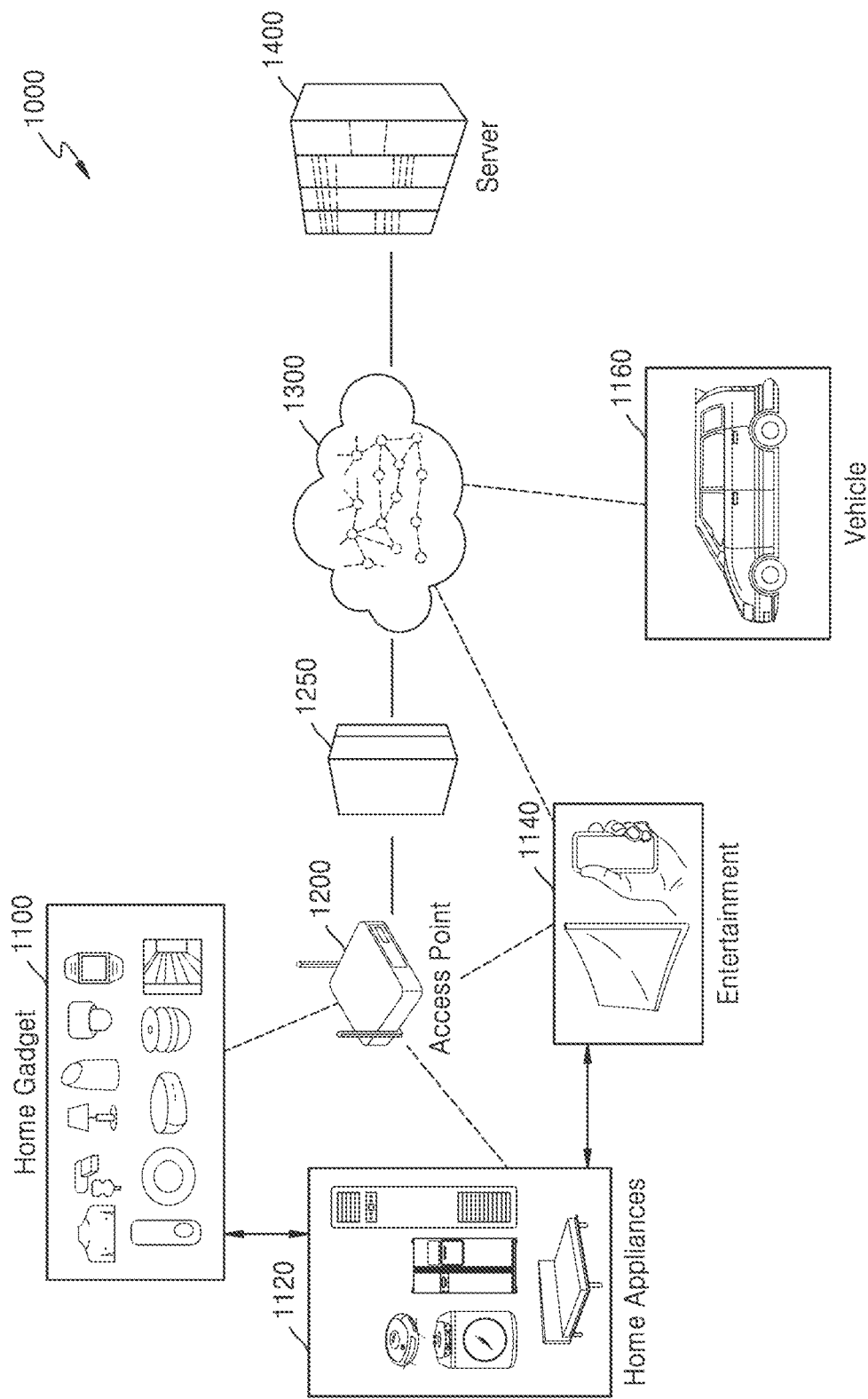
FIG. 19 is a conceptual diagram illustrating an Internet of Things (IoT) network system to which some example embodiments are applied.

FIG. 19 is a conceptual diagram illustrating an Internet of Things (IoT) network system 1000 to which some example embodiments are applied.

Referring to FIG. 19, the IoT network system 1000 may include a plurality of IoT apparatuses 1100, 1120, 1140, and 1160, an access point 1200, a gateway 1250, a wireless network 1300, and a server 1400. The IoT may refer to a network between things using wired/wireless communication.

Each of the IoT apparatuses 1100, 1120, 1140, and 1160 may form a group according to characteristics of each IoT apparatus. For example, IoT apparatuses may be grouped into a home gadget group 1100, a home appliance/furniture group 1120, an entertainment group 1140, a vehicle group 1160, and the like. The plurality of IoT apparatuses 1100, 1120, 1140, and 1160 may be connected to a communication network or connected to other IoT apparatuses via the access point 1200. The access point 1200 may be embedded in one IoT apparatus. The gateway 1250 may change a protocol to connect the access point 1200 to an external wireless network. The IoT apparatuses 1100, 1120, 1140, and 1160 may be connected to an external communication network via the gateway 2250. The wireless network 1300 may include the Internet and/or a public network. The plurality of IoT apparatuses 1100, 1120, 1140, and 1160 may be connected via the wireless network 1300 to the server 1400 providing a certain service, and a user may use the service via at least one of the plurality of IoT apparatuses 1100, 1120, 1140, and 1160.

According to some example embodiments, the plurality of IoT apparatuses 1100, 1120, 1140, and 1160 may transmit and receive channel smoothing-related phase information to and from each other, and may perform smooth beamforming on the basis of the channel smoothing-related phase information. Accordingly, the IoT apparatuses 1100, 1120, 1140, and 1160 may provide a high-quality service to the user by performing efficient and effective communication.

The term 'processing circuitry,' 'circuitry' and similar language (e.g., controller, or related to devices and components such as the beamformer 21, beamformee 22, stations 1-4, access points 1-2, etc.) as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

Embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed concurrently, simultaneously, contemporaneously or in some cases be performed in reverse order. As used herein the term "and/or" includes any and all combinations of one or more of the associated listed items.

As described above, some example embodiments have been provided in the description with reference to the accompany drawings. Although the example embodiments have been described herein by using the particular terms, the particular terms are used only for the purpose of describing the spirit of the inventive concepts and are not used to restrict the meaning thereof or limit the scope of the inventive concepts defined by the appended claims. While the inventive concepts have been particularly shown and described with reference to some example embodiments thereof, it will be understood that various changes in form and details may be made therein without departing from the spirit and scope of the following claims.

What is claimed is:

1. An operation method of a first apparatus configured to communicate with a second apparatus in a wireless local area network (WLAN) system comprising the first apparatus and the second apparatus, the operation method comprising:
receiving, from the second apparatus, a null data packet (NDP) based on a certain protocol standard;
estimating a channel with the second apparatus, on the basis of the NDP;
determining, on the basis of the estimated channel, whether or not a channel smoothing-related condition is satisfied;
generating channel smoothing-related phase information on the basis of a result of the determination; and
transmitting, to the second apparatus, a feedback frame including the channel smoothing-related phase information; wherein the determining whether or not the channel smoothing-related condition is satisfied includes:
acquiring, from the estimated channel, beam steering matrices respectively corresponding to subcarriers; and
determining whether or not each subcarrier satisfies the channel smoothing-related condition, on the basis of a relationship between beam steering matrices corresponding to adjacent subcarriers; and
wherein the determining whether or not each subcarrier satisfies the channel smoothing-related condition is performed sequentially with respect to the subcarriers arranged on the basis of an index, and is omitted after a start subcarrier first satisfying the channel smoothing-related condition.

2. The operation of method of claim 1, wherein the generating the channel smoothing-related phase information includes generating the channel smoothing-related phase information including pieces of phase information corresponding to a first subcarrier and subcarriers after the start subcarrier from among the subcarriers arranged on the basis of the index.

3. The operation method of claim 1, wherein the relationship between the beam steering matrices includes at least one of an euclidean distance between the beam steering matrices and a cross-correlation between the beam steering matrices, and the channel smoothing-related condition includes at least one of a condition that the euclidean distance is greater than or equal to a first reference value and a condition that the cross-correlation is less than or equal to a second reference value.

4. The operation method of claim 1, wherein, based on the channel smoothing-related condition being satisfied and the first apparatus including one antenna, the generating the channel smoothing-related phase information includes generating, as the channel smoothing-related phase information, first phases of elements corresponding to a last row of each column in a beam steering matrix for each subcarrier, acquired from the estimated channel.

5. The operation method of claim 4, wherein, based on the channel smoothing-related condition being satisfied and the first apparatus including a plurality of antennas, the generating the channel smoothing-related phase information includes generating, as the channel smoothing-related phase information, second phases for minimizing an euclidean distance between beam steering matrices corresponding to adjacent subcarriers, acquired from the estimated channel or maximizing a cross-correlation between the beam steering matrices.

6. The operation method of claim 1, wherein, based on the channel smoothing-related condition not being satisfied, the generating the channel smoothing-related phase information includes generating the channel smoothing-related phase information including data indicating that the channel smoothing-related phase information is empty information.

7. The operation method of claim 1, further comprising:
receiving a physical layer protocol data unit (PPDU) smooth beamformed on the basis of the channel smoothing-related phase information; and
performing channel smoothing on the smooth beamformed PPDU.

8. The operation method of claim 1, wherein the feedback frame includes a smooth beamforming report field having the channel smoothing-related phase information arranged therein.

9. The operation method of claim 8, wherein the feedback frame further includes a multi-input multi-output (MIMO) control field having arranged therein a subfield having a value indicating whether or not the channel smoothing-related phase information is present.

10. The operation method of claim 9, wherein the smooth beamforming report field includes a subfield including an index of a start subcarrier first satisfying the channel smoothing-related condition, and subfields respectively including pieces of phase information corresponding to subcarriers including the start subcarrier.

11. The operation method of claim 1, wherein the certain protocol standard includes an extremely high throughput (EHT) protocol standard.

12. The operation method of claim 1, wherein the determining whether or not the channel smoothing-related condition is satisfied includes selecting at least one of a plurality of conditions as the channel smoothing-related condition, on the basis of a communication state with the second apparatus.

13. An operation method of a second apparatus configured to communicate with a first apparatus in a wireless local area network (WLAN) system comprising the first apparatus and the second apparatus, the operation method comprising:
transmitting, to the first apparatus, a null data packet (NDP) based on a certain protocol standard;
receiving, from the first apparatus in response to the transmitted NDP, a feedback frame including first information regarding an estimated channel between the first apparatus and the second apparatus, and second information indicating whether or not channel smoothing-related phase information is included; wherein the feedback is determined whether or not a channel smoothing-related condition is satisfied includes:
acquiring, from the estimated channel, beam steering matrices respectively corresponding to subcarriers; and
determining whether or not each subcarrier satisfies the channel smoothing-related condition, on the basis of a relationship between beam steering matrices corresponding to adjacent subcarriers; and
wherein the feedback is determined whether or not each subcarrier satisfies the channel smoothing-related condition is performed sequentially with respect to the subcarriers arranged on the basis of an index, and is omitted after a start subcarrier first satisfying the channel smoothing-related condition;
generating a smooth beamformed physical layer protocol data unit (PPDU) on the basis of the first information and the second information; and
transmitting the smooth beamformed PPDU to the first apparatus.

14. The operation method of claim 13, wherein, based on the second information indicating that the channel smoothing-related phase information is included, the generating the smooth beamformed PPDU includes generating the smooth beamformed PPDU by reflecting the channel smoothing-related phase information in the first information regarding the estimated channel.

15. The operation method of claim 13, wherein, based on the second information indicating that the channel smoothing-related phase information is not included, the generating the smooth beamformed PPDU includes generating the smooth beamformed PPDU on the basis of the first information regarding the estimated channel.

16. The operation method of claim 13, wherein the first information includes angle information regarding a beam steering matrix for each subcarrier, and the channel smoothing-related phase information includes information for reducing discontinuity between beamforming matrices corresponding to adjacent subcarriers in the smooth beamforming PPDU.

17. The operation method of claim 16, wherein a type of the channel smoothing-related phase information is based on a number of antennas of the first apparatus.

18. A first apparatus configured to communicate with a second apparatus in a wireless local area network (WLAN) system, the first apparatus comprising:
   a transceiver configured to receive a null data packet (NDP) based on an extremely high throughput (EHT) protocol standard; and
   processing circuitry configured to
      determine, in response to the NDP, whether or not a channel smoothing-related condition is satisfied, on the basis of on an estimated channel between the first apparatus and the second apparatus,
      generate channel smoothing-related phase information on the basis of a result of the determination, and
      control the transceiver to transmit, to the second apparatus, a feedback frame including the channel smoothing-related phase information; wherein the determining whether or not the channel smoothing-related condition is satisfied includes:
   acquiring, from the estimated channel, beam steering matrices respectively corresponding to subcarriers; and
   determining whether or not each subcarrier satisfies the channel smoothing-related condition, on the basis of a relationship between beam steering matrices corresponding to adjacent subcarriers; and
   wherein the determining whether or not each subcarrier satisfies the channel smoothing-related condition is performed sequentially with respect to the subcarriers arranged on the basis of an index, and is omitted after a start subcarrier first satisfying the channel smoothing-related condition.

* * * * *